(12) United States Patent
Muhlrad et al.

(10) Patent No.: US 12,097,925 B1
(45) Date of Patent: Sep. 24, 2024

(54) PENDULUM-DRIVEN UNMANNED VEHICLE

(71) Applicant: Guardbot Inc, Stamford, CT (US)

(72) Inventors: Peter Muhlrad, Old Greenwich, CT (US); Aleksandr R. Geltser, Stamford, CT (US)

(73) Assignee: Guardbot Inc, Stamford, CT (US)

( * ) Notice: Subject to any disclaimer, the term of this patent is extended or adjusted under 35 U.S.C. 154(b) by 81 days.

(21) Appl. No.: 17/713,706

(22) Filed: Apr. 5, 2022

Related U.S. Application Data

(60) Provisional application No. 63/170,785, filed on Apr. 5, 2021.

(51) Int. Cl.
| | |
|---|---|
| *B25J 5/00* | (2006.01) |
| *B62K 11/00* | (2006.01) |
| *B62M 1/00* | (2010.01) |

(52) U.S. Cl.
CPC ............ *B62K 11/007* (2016.11); *B25J 5/007* (2013.01)

(58) Field of Classification Search
CPC ................................ B62K 11/007; B25J 5/007
USPC ..................................................... 318/568.12
See application file for complete search history.

(56) References Cited

U.S. PATENT DOCUMENTS

| | | | | |
|---|---|---|---|---|
| 3,798,835 | A * | 3/1974 | McKeehan ........... | A63H 33/005 446/442 |
| 8,632,089 | B1 * | 1/2014 | Bezerra ................. | B62M 1/28 280/252 |
| 9,428,019 | B1 * | 8/2016 | Muhlrad ............... | B60F 3/0007 |
| 2008/0097644 | A1 * | 4/2008 | Kaznov ................. | A63H 30/04 700/47 |
| 2011/0060492 | A1 * | 3/2011 | Kaznov ................. | B60L 53/00 701/23 |
| 2012/0175175 | A1 * | 7/2012 | Gomi .................... | B62K 11/007 180/21 |
| 2020/0062114 | A1 * | 2/2020 | Holmes ................. | F16H 48/05 |
| 2021/0001852 | A1 * | 1/2021 | Wishart ............... | B60L 15/2009 |

OTHER PUBLICATIONS

"A Review of Active Mechanical Driving Principles of Spherical Robots", Richard Chase and Abhilash Pandya, Robotics 2012, 1, 3-23; doi:10.3390/robotics1010003.

\* cited by examiner

*Primary Examiner* — Gabriel Agared
(74) *Attorney, Agent, or Firm* — Gordon & Jacobson, P.C.

(57) ABSTRACT

An unmanned vehicle is provided that includes a housing configured to rotate about a rotational axis. The housing supports a pendulum drive assembly having coaxial first and second drive axles that are coaxially aligned with the rotational axis. A first rotating member is mechanically coupled to the first drive axle and configured to rotate with the first drive axle. A second rotating member is mechanically coupled to the second drive axle and configured to rotate with the second drive axle. The pendulum drive assembly includes a first electrical motor and corresponding first transmission system that are operably coupled to the first drive axle as well as a second electrical motor and corresponding second transmission system that are operably coupled to the second drive axle. The first electrical motor, the first transmission system, the second electrical motor, and the second transmission system contribute to an effective pendulum mass disposed within the housing that rotates about the rotational axis of the housing relative to the housing and driven by operation of at least one the first electrical motor and second electrical motor to propel the unmanned vehicle.

11 Claims, 26 Drawing Sheets

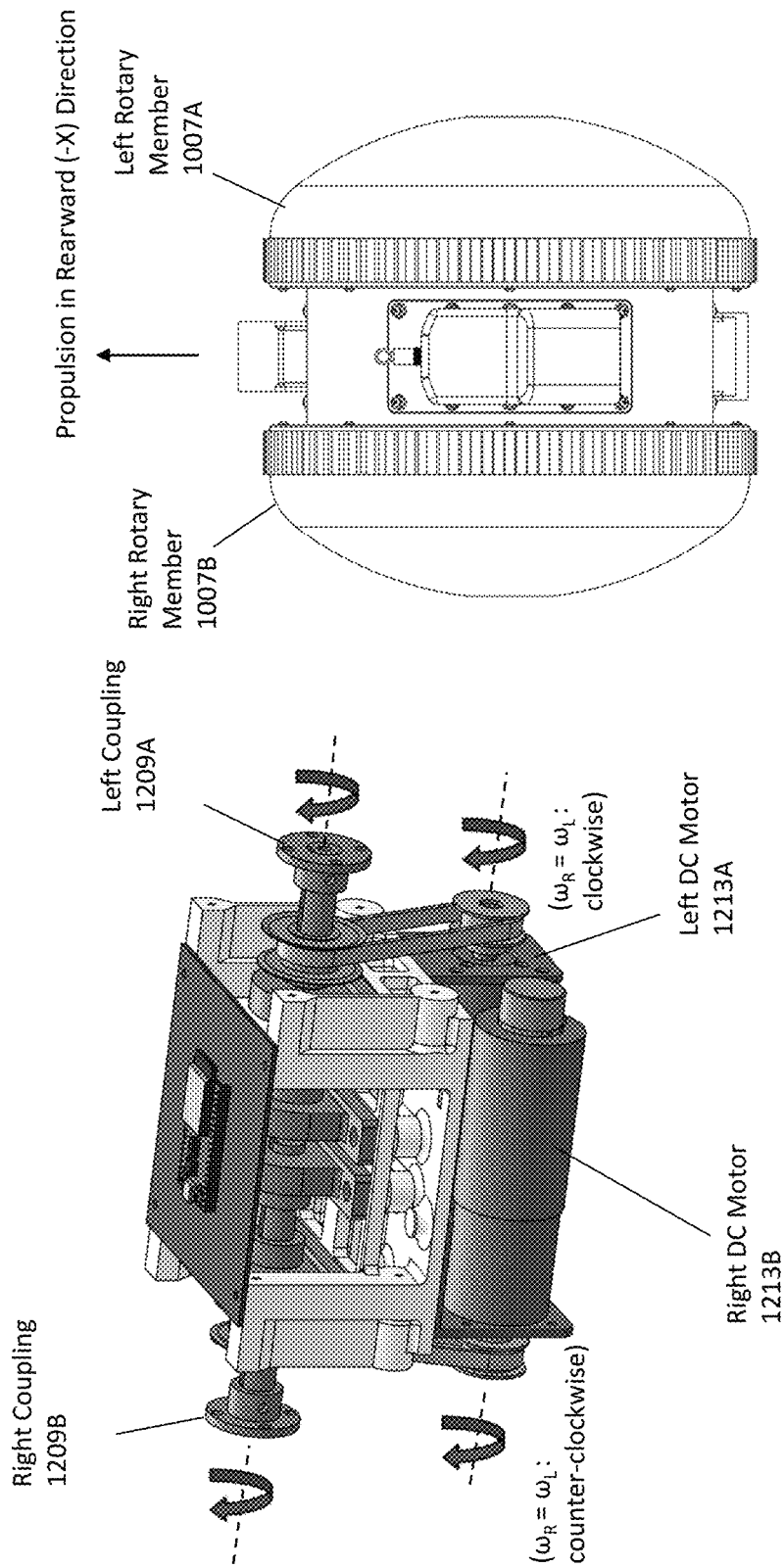

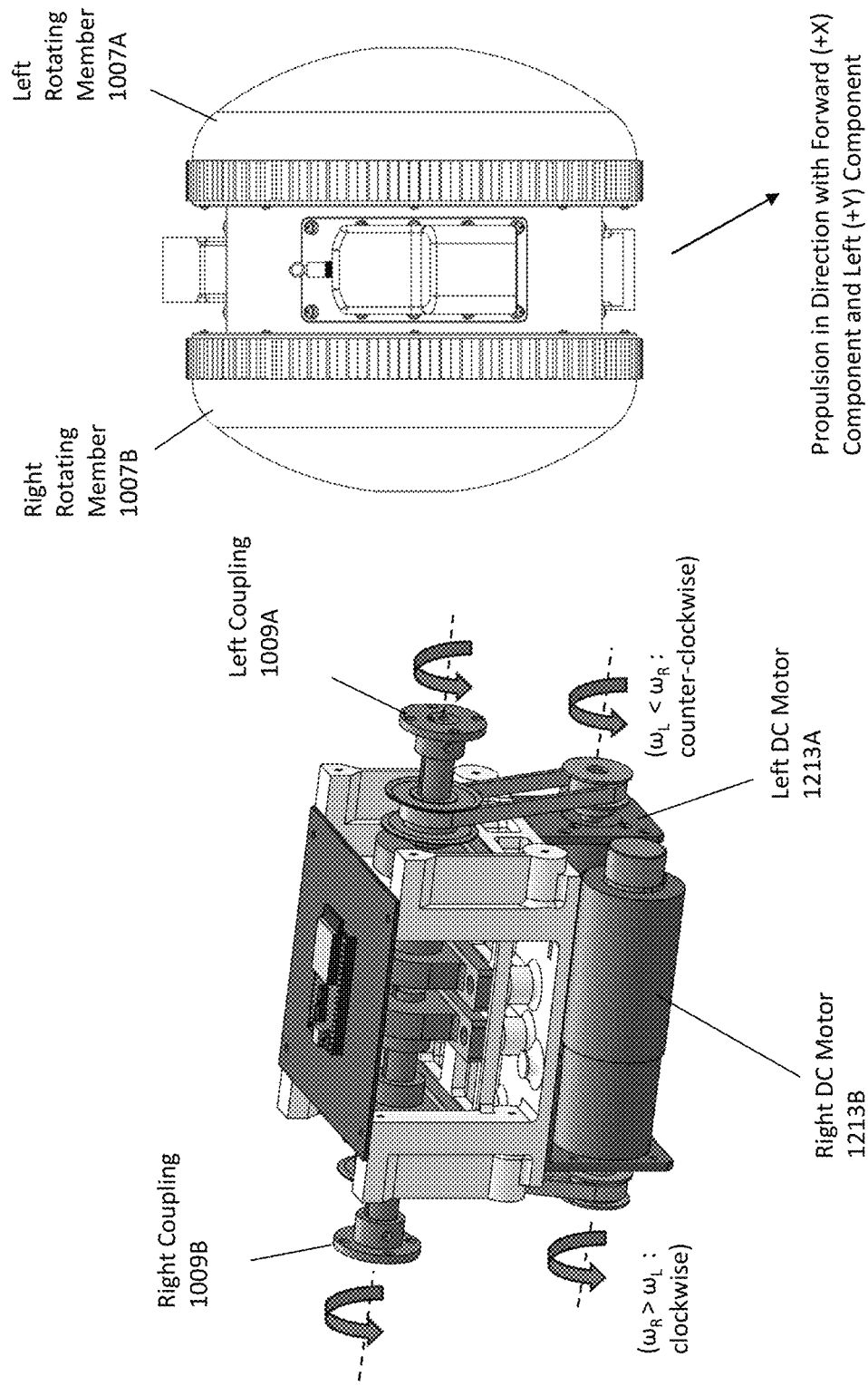

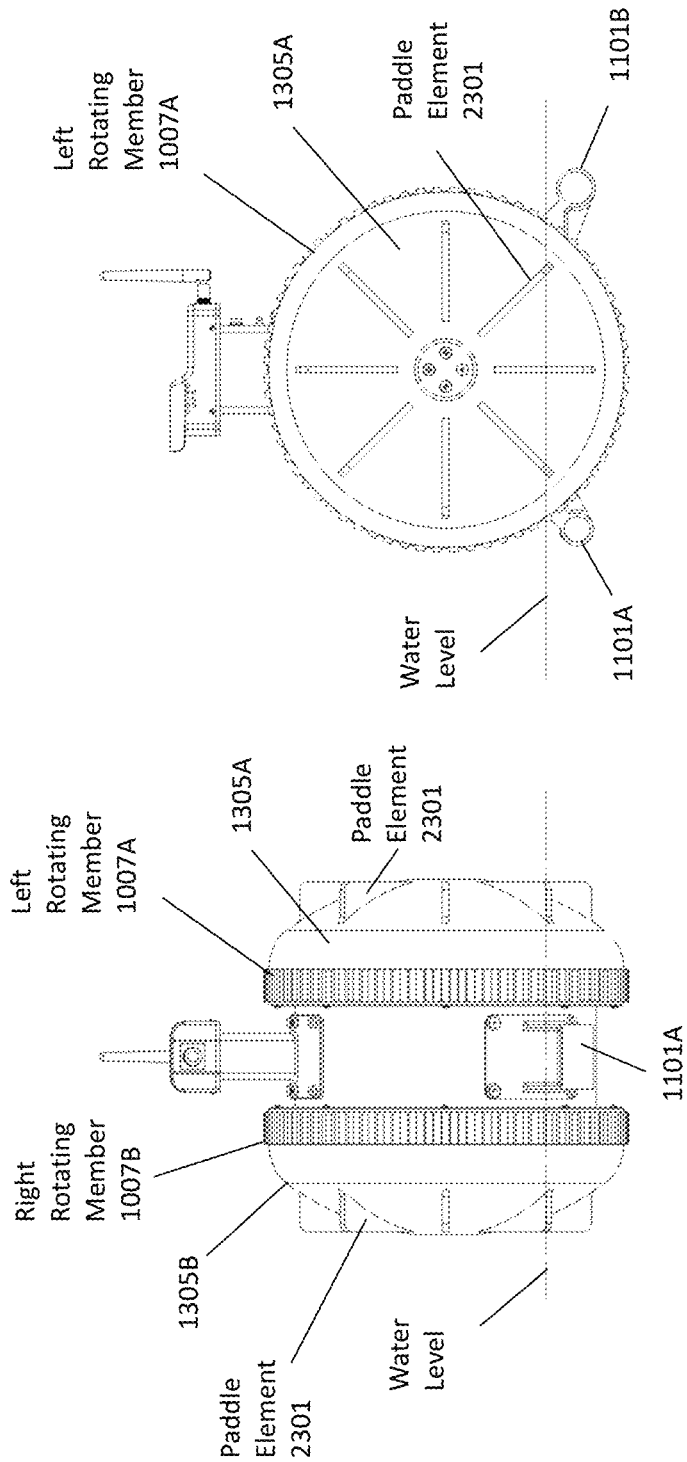

PENDULUM-DRIVEN UNMANNED VEHICLE

CROSS-REFERENCE TO RELATED APPLICATION

This application claims priority from U.S. Provisional Application No. 63/170,785, filed on Apr. 5, 2021, which is hereby incorporated by reference herein in its entirety.

BACKGROUND

1. Field

The present disclosure relates to pendulum-driven unmanned vehicles.

2. State of the Art

Pendulum-driven unmanned vehicles or robots exhibit unique dynamic behavior suitable for amphibious applications and unstructured environments, such as for reconnaissance and exploration. A conventional amphibious pendulum-driven robotic ball is shown in FIG. 1. The ball 10 includes a shell 20 and operates by actuating rotation of two pendulum masses 50 and 90/120 about two independent rotational axles 40, 100. Movement of the pendulum mass 50 about the rotational axle 40 propels the ball 10 to roll forward by moving the center of mass of the ball 10 in front of a contact patch with the ground. Movement of the pendulum mass 90/120 about the rotational axle 100 can introduce a steering angle to the motion of the ball 10. As the center of mass of the system shifts relative to the contact patch, the ball 10 rolls to compensate forming a rolling motion or performing a steering movement. The two pendulum masses 50 and 90/120 typically include respective electrical motors and transmission arrangements 70,110 to drive the rotational movement of the two pendulum masses. In this conventional design, the two degrees of freedom are implemented in orthogonal axes making the packaging of such a system inefficient because it requires a large portion of the volume of the shell 20 to be hollow space that allows for complete movement of the two pendulum masses in both axes.

The pendulum-driven robotic ball of FIG. 1 employs motors and transmission systems to shift the effective center of mass of the robotic ball in order to produce desired motion. Consider a robotic sphere resting in equilibrium. The motors and transmission systems operate to shift the mass distribution of the robotic ball, causing the robotic ball to roll to a new position of equilibrium. With proper timing and control, the robotic ball can move smoothly through its environment. However, the main limitation of this method is that the maximum output torque is constrained because the center of gravity cannot be shifted outside of the shell. This can be illustrated by picturing a pendulum mass inside a sphere as illustrated in FIG. 2, which is a common and straightforward design. This simplified two-dimensional model illustrates the torque that can be generated and mechanically applied to the outer shell. A weighted pendulum mass rotates or swings on an armature about a support axle located through the center axis of the shell. As the pendulum mass rotates, the effective center of mass rotates accordingly, and the robotic ball rolls to equilibrium. The maximum value of the torque that can be applied is given as $\tau = mgr^* \sin(\theta)$, where t is the output torque about the z-axis, mg is the weight of the pendulum mass, r is the displacement of the pendulum center of mass from the shell's center of mass, and $\sin(\theta)$ corresponds to the rotation angle from horizontal.

Another pendulum-driven robotic ball is described in Applicant's prior U.S. Pat. No. 9,428,019 and shown in FIGS. 3A and 3B, which includes two or more coaxial or parallel axis pendulums—a right pendulum mass 230 and a left pendulum mass 220, each coupled to a main axle 210. When both pendulum masses 220, 230 are driven forward in tandem (via a motor mechanism not shown), the robotic ball 200 will accelerate straight ahead. In this mode, the center of mass of the robotic ball 200 is ahead of the contact patch in exactly the same way as the conventional implementation of FIG. 1. When both pendulum masses 220, 230 are returned to a neutral position, the robotic ball 200 can continue to roll straight ahead limited by frictional resistance and inclination of the ground and obstacles (when present). In this design, the robotic ball 200 can be steered by the opposing motion of the two pendulum masses 220, 230 (i.e., driving one pendulum mass forward and the other pendulum mass backward). In particular, FIG. 3B depicts the robot ball 200 initiating a turn, with one pendulum mass 230 moved forward and a separated from the other pendulum mass 220 moved backward. This mode of turning differs significantly from the conventional system. The turn is completed when the movement of both masses is stopped (i.e., when both masses are returned to a neutral position). In this design, the packaging of the system is inefficient because it requires a large portion of the volume of the robotic ball to be hollow space that allows for complete movement of the two pendulum masses about the main axle 210.

BRIEF DESCRIPTION OF THE DRAWINGS

The detailed description below, given by way of example and not intended to limit the present disclosure solely thereto, will best be understood in conjunction with the accompanying drawings as follows.

FIG. 17A is a schematic view of the driver sub-assembly of the pendulum assembly under such control, and FIG. 17B is a top schematic view of the vehicle showing the resulting traveling direction of the vehicle under such control.

FIGS. 18A and 18B are schematic views that illustrate control of the left and right electrical motors of the driver sub-assembly of FIGS. 10 and 11 to propel the vehicle in a traveling direction corresponding to the rearward directional component. FIG. 18A is a schematic view of the driver sub-assembly of the pendulum assembly under such control, and FIG. 18B is a top schematic view of the vehicle showing the resulting traveling direction of the vehicle under such control.

FIGS. 19A and 19B are schematic views that illustrate control of the left and right electrical motors of the driver sub-assembly of FIGS. 10 and 11 to propel the vehicle in a traveling direction with a forward directional component and a left direction component. FIG. 19A is a schematic view of the driver sub-assembly of the pendulum assembly under such control, and FIG. 19B is a top schematic view of the vehicle showing the resulting traveling direction of the vehicle under such control.

FIG. 20A is a schematic view of the driver sub-assembly of the pendulum assembly under such control, and FIG. 20B is a top schematic view of the vehicle showing the resulting traveling direction of the vehicle under such control.

FIG. 21A is a schematic view of the driver sub-assembly of the pendulum assembly under such control, and FIG. 21B is a top schematic view of the vehicle showing the resulting traveling direction of the vehicle under such control.

FIG. 22A is a schematic view of the driver sub-assembly of the pendulum assembly under such control, and FIG. 22B is a top schematic view of the vehicle showing the resulting traveling direction of the vehicle under such control.

FIG. 23A is a schematic view of the driver sub-assembly of the pendulum assembly under such control, and FIG. 23B is a front schematic view of the vehicle showing the resulting spinning movement of the vehicle under such control.

FIG. 24A is a schematic view of the driver sub-assembly of the pendulum assembly under such control, and FIG. 24B is a front schematic view of the vehicle showing the resulting spinning movement of the vehicle under such control.

FIG. 25B is a front view of the pendulum-driven unmanned vehicle of FIG. 25A when traveling in water.

FIG. 25C is a side view of the pendulum-driven unmanned vehicle of FIG. 25A when traveling in water.

DETAILED DESCRIPTION OF THE PREFERRED EMBODIMENTS

Figure 1:
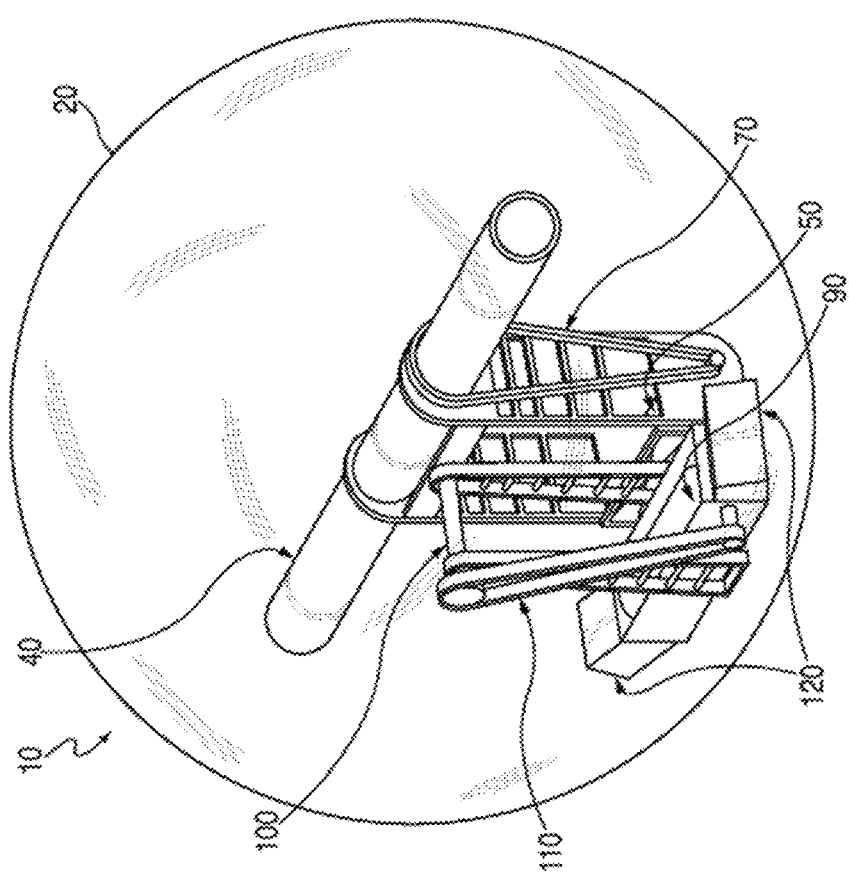
FIG. 1 is a schematic diagram of a prior art amphibious robotic ball.
Figure 2:
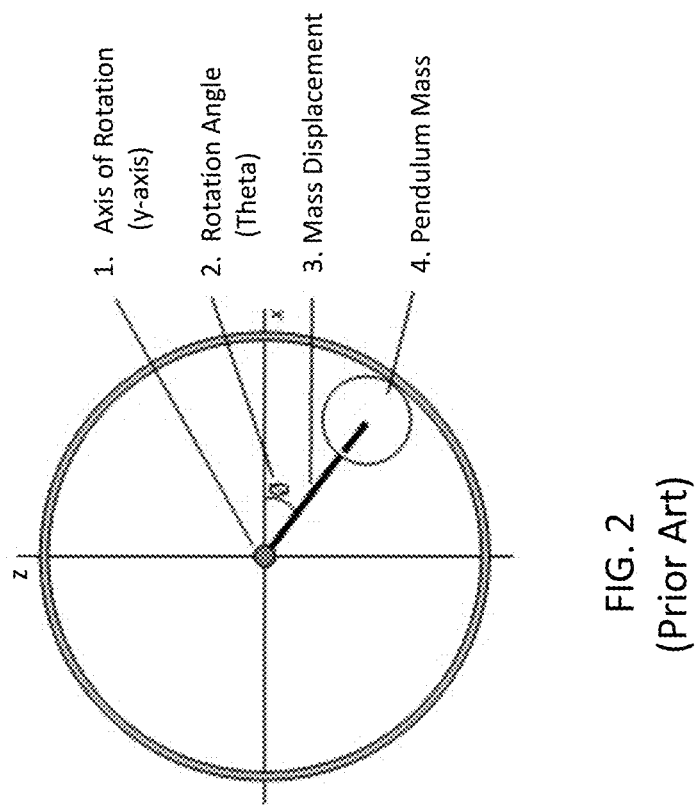
FIG. 2 is an illustration of a two-dimensional model of pendulum action that drives the motion of the robotic ball of FIG. 1.
Figure 3A:
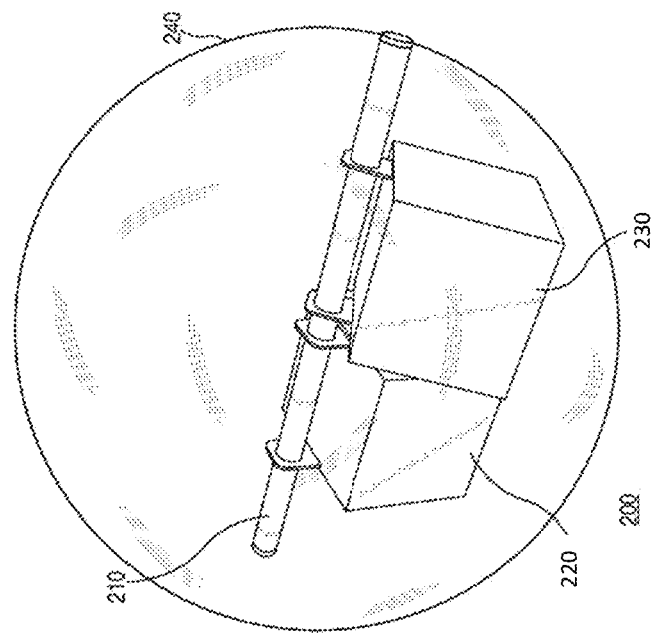
FIGS. 3A and 3B are schematic diagrams of another prior art amphibious robotic ball.
Figure 3B:
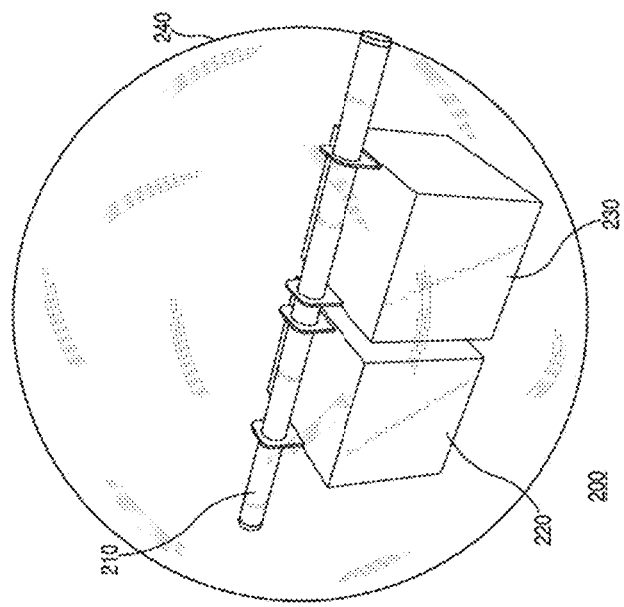
Figure 4:
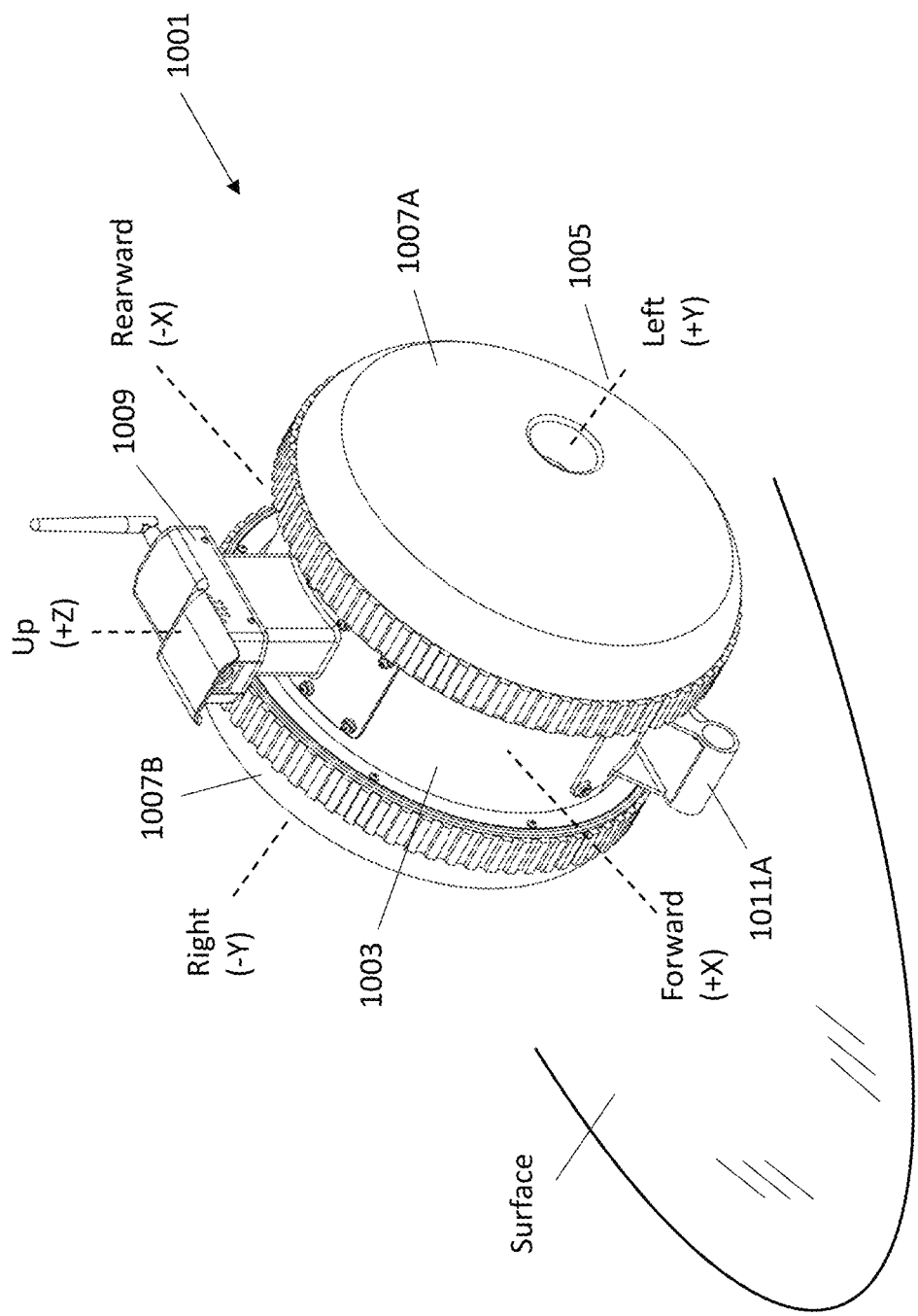
FIG. 4 is a perspective view of a pendulum-driven unmanned vehicle according to an embodiment of the present disclosure.

In the present disclosure, like reference numbers refer to like elements throughout the drawings, which illustrate various exemplary embodiments of the present disclosure.

FIGS. 4 to 8 illustrate an unmanned spherically-shaped vehicle 1001 that is configured to move across a surface (e.g., ground or water) and designed for amphibious operation. The vehicle 1001 can be used for reconnaissance or exploration or other suitable applications. The vehicle 1001 includes a cylindrical pendulum assembly 1003 that is configured to rotate about a central axis 1003 as shown. Left and right rotating members 1007A, 1007B are disposed at opposite ends of the pendulum assembly 1003 and are configured to rotate coaxially about the axis 1003. The left and right rotating members 1007A, 1007B effectively cover the ends of the pendulum assembly 1003. In embodiments, the left and right rotating members1007A, 1007B can be assembled as respective hemispherical shells that cover the ends of the pendulum assembly 1003 such that the vehicle 1001 embodies a sphere or ball-like shape. The pendulum assembly 1003 provides a center propulsion mass that can move in a counter-rotational manner relative to the left and right rotating members 1007A, 1007B to allow the vehicle 1001 to move as a sphere (ball shape), including rotation of 360 degrees about one spot as well as forward and backward movement as described herein. In this embodiment, a reference XYZ coordinate system can be defined to specify the neutral or at rest configuration of the vehicle 1001 where the central axis 1003 lies along the Y axis, the forward and rearward directions of travel of the vehicle 1001 lie along the X axis, and up and down directions lie long the Z axis. In this case, the origin of the reference XYZ coordinate system lies at the cylinder center point of the pendulum assembly 1003, the left direction corresponds to the positive Y direction, the right direction corresponds to the negative Y direction, the forward direction corresponds to the positive X direction, the rearward direction corresponds to the negative X direction, the up direction corresponds to the positive Z direction, and the down direction corresponds to the negative Z direction. In this case, the left rotating member 1007A is disposed at the left (+Y) end of the pendulum assembly 1003, and the right rotating member 1007B is disposed at the right (−Y) end of the pendulum assembly 1003. The pendulum assembly 1003 is configured to rotate about the central axis 1003 to rotate the pendulum mass contained within pendulum assembly 1003 to impart motion to the vehicle where one (or both) of the rotating members 1007A, 1007B rotate about the axis 1003 in contact with the surface. Such motion can be in the forward direction, in the reverse direction, in the forward direction with a component in the left or right direction, in the rearward direction with a component in the left or right direction, and spinning motions as described herein.

The top portion of the pendulum assembly 1003 supports a sensor and communication unit 1009 which includes sensors, such as one or more cameras (video/still), GPS module or other location services functionality, LIDAR module, radar module, sonar module, microphone, gyroscope, multi-axis accelerometers, or other measurement sensors that can be used to gather information pertaining to the environment encountered by the vehicle 1001 as it moves over the surface. Additionally or alternatively, one or more sensors (e.g., camera(s), sonar modules or other measurement sensors) can be integrated into (or attached to) the bottom portion of pendulum assembly and operated to gather information pertaining to an underwater environment encountered by the vehicle 1001 as it moves through water as described herein. Such information can be used for surveillance and exploration of the environment or other useful functions as well as for autonomous control of the movement of the vehicle 1001. The sensor and communication unit 1009 can also include wireless communication equipment (such an RF transmitter and RF antenna) to allow for wireless transmission of sensor information to a remote system (not shown). Such wireless transmission can be used to communicate the sensor information gathered by the sensors of the unit 1009 (e.g., video captured by an integral camera) from the unit 1009 to the remote system for storage and analysis. The sensor and communication unit 1009 can also include wireless communication equipment (such an RF modem and RF antenna) that allow for bidirectional wireless data communication with the remote system. The wireless communication equipment can support bidirectional wireless data communication over one or more standard RF communication protocols, such as one or more IEEE 802.11 protocols or other suitable standard RF, satellite, LTE 4G/5G communication protocols and other mobile data or other wireless communication protocols. Such bidirectional communication can be used to communicate the information gathered by the sensors of the unit 1009 from the unit 1009 to the remote system for storage and analysis. The bidirectional communication can also be used to communicate control signals or commands from the remote system to the unit 1009 to control operation of the vehicle 1001, such as for controlling the path of movement or target area of travel for the vehicle 1001. In other embodiments, the sensor and communication unit 1009 can possibly employ one or more solar panels to harvest solar energy for charging or powering the electrical components of the vehicle 1001.

Figure 5:
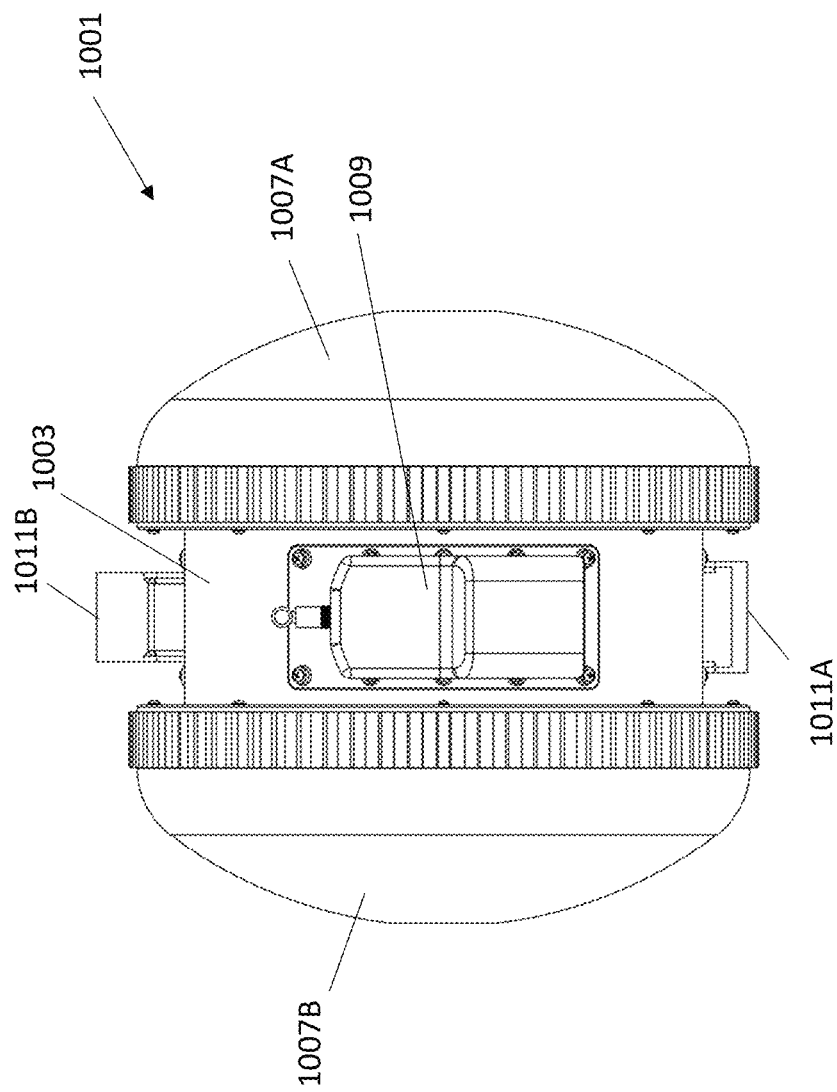
FIG. 5 is a top view of the pendulum-driven unmanned vehicle of FIG. 4.
Figure 7:
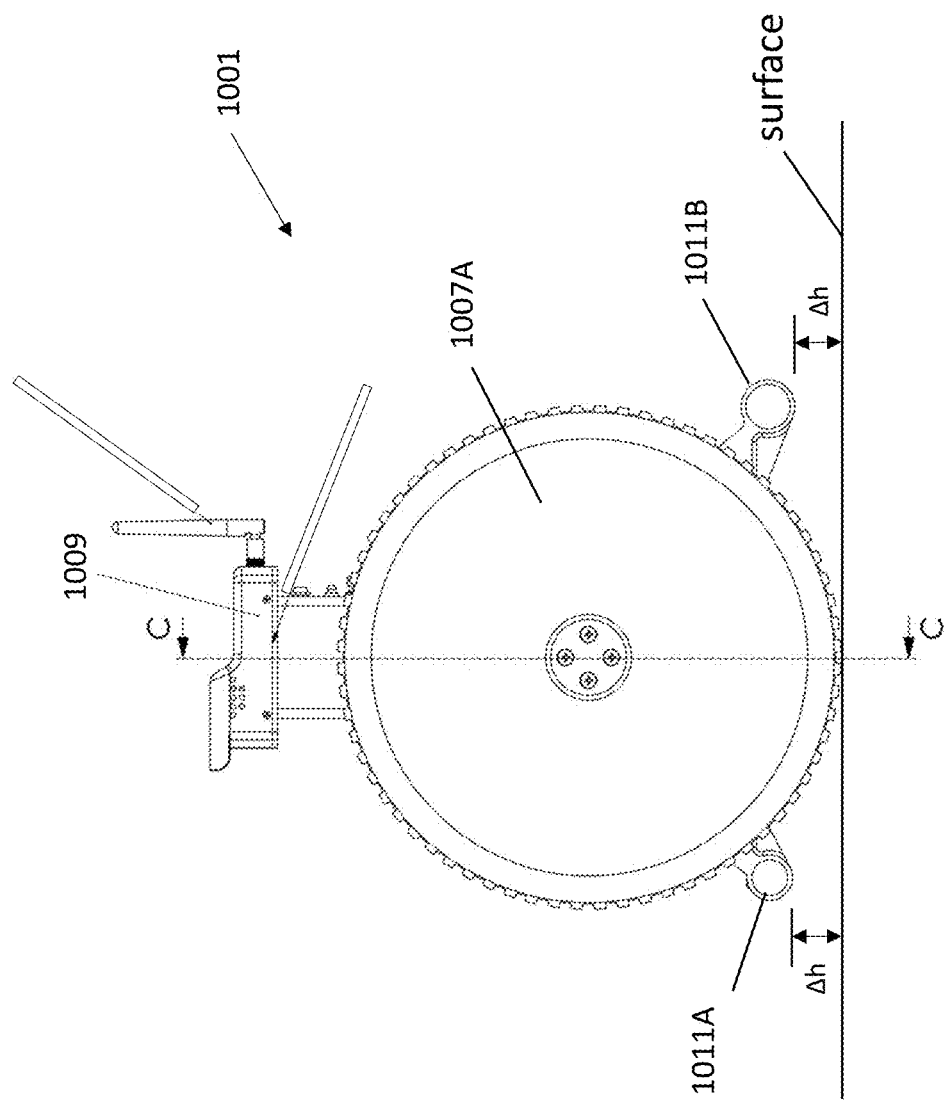
FIG. 7 is a side view of the pendulum-driven unmanned vehicle of FIG. 4 when traveling on a hard surface, such as the ground.

The bottom portion of the pendulum assembly 1003 supports front and rear support structures 1011A, 1011B as best shown in FIGS. 5 and 7. The rear support structure 1011B is configured to contact to the surface at a predefined maximum angle of rotation of the pendulum assembly 1003 toward the forward direction (i.e., clockwise rotation when viewed from the left in FIG. 4) and thus limit the forward rotation of the pendulum assembly 1003. The forward support structure 1011A is configured to contact to the surface at a predefined maximum angle of rotation of the pendulum assembly 1003 toward the rearward direction (i.e., counter-clockwise rotation when viewed from the left in FIG. 4) and thus limit the rearward rotation of the pendulum assembly 1003. The vertical offset (Δh, FIG. 7) of the front and rear support structures 1011A, 1011B relative to the contact patch of the left and right rotating members 1007A, 1007B with the surface can be configured to set the corresponding predefined maximum angles of rotation of the pendulum assembly 1003 toward the forward and rearward directions and the maximum applied torque from the rotation of the pendulum assembly 1003. Note that when the rear support structure 1011B contacts the surface at the predefined maximum angle of rotation of the pendulum assembly 1003 toward the forward direction, the operating mode of the one or more electrical motor(s) that drive such rotation can be configured to automatically transition to a direct-drive mode where the output rotational torque of the respective motor(s) drives the corresponding rotating member 1007A and/or 1007B to move the vehicle in the forward direction as described herein. Similarly, when the front support structure 1011A contacts the surface at the predefined maximum angle of rotation of the pendulum assembly 1003 toward the rearward direction, the operating mode of the one or more electrical motor(s) that drive such rotation can be configured to automatically transition to a direct-drive mode where the output rotational torque of the respective motor(s) drives the corresponding rotating members 1007A and/or 1007B to move the vehicle in the rearward direction as described herein. Such direct-drive mode can possibly be used to overcome obstacles or hilly terrain that would otherwise need to be avoided by the navigation of the vehicle.

Note that when the vehicle 1001 moves at constant speed on a horizontal surface, the pendulum assembly 1003 can be rotated at a small rotation angle sufficient to compensate for the decrease in speed of the vehicle due to friction and air resistance, etc. During such operation, the front and rear support structures 1011A, 1011B do not touch the surface. However, when the movement of the vehicle is starting, stopping, or overcoming an obstacle, such operations involve significant acceleration, which requires rotation of the pendulum assembly 1003 at larger angles. During these operations, the front and rear support structures 1011A, 1011B prevent extreme rotation of the pendulum to stabilize the sensor and communication unit 1009 (which aids in imaging acquired by the integral camera) and aids in uphill movement and overcoming obstacles.

Figure 8:
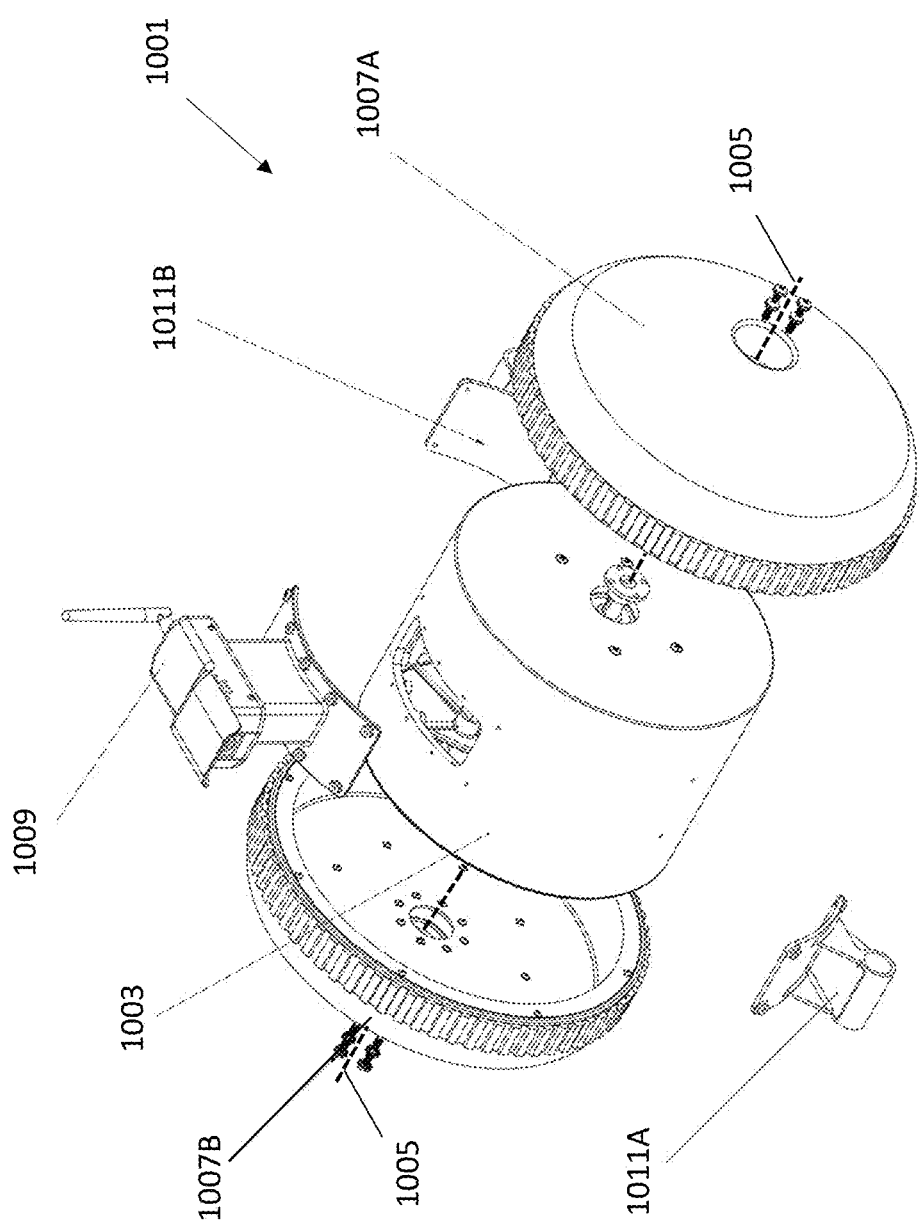
FIG. 8 is an exploded view illustrating the major parts of the pendulum-driven unmanned vehicle of FIG. 4.
Figure 9:
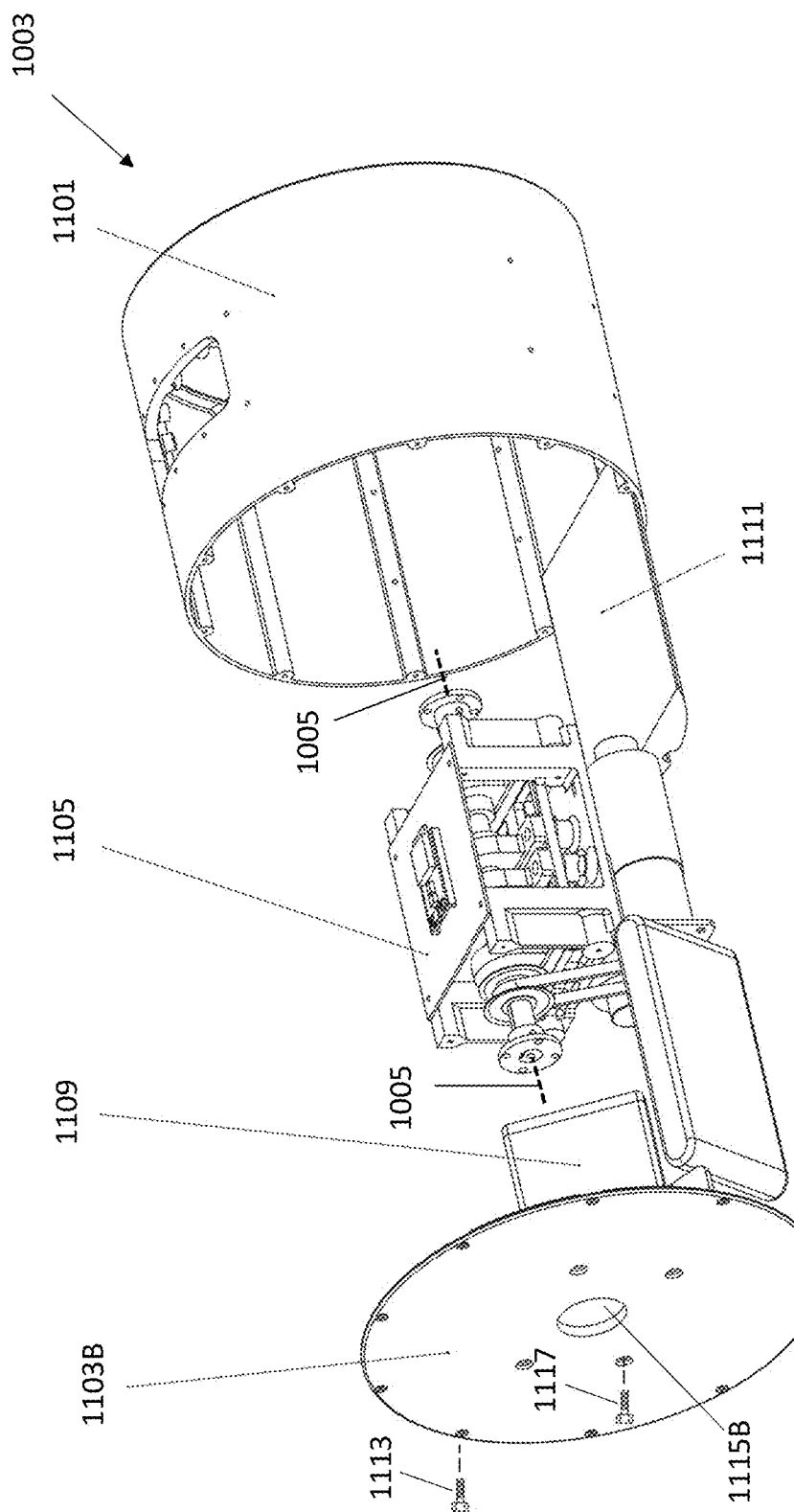
FIG. 9 is an exploded view of the pendulum assembly of the vehicle of FIGS. 4 and 8.

FIG. 8 depicts an exploded view of the major parts or assemblies of the vehicle 1001, and FIG. 9 depicts an exploded view of the pendulum assembly 1003 of FIG. 8.

As shown in FIG. 9, the pendulum assembly 1003 includes a cylindrical housing 1101 with end plates 1103A, 1103B where one end plate 1103B is shown for the right side. The cylindrical housing 1101 supports a driver sub-assembly 1105 that provides controlled rotation of the pendulum assembly 1003 about its central axis 1005 and other direct drive functions as described herein. The cylindrical housing 1101 can also support one or more electrical power sources 1109 (e.g., rechargeable batteries). In one embodiment, the one or more electrical power sources 1109 can include two rechargeable batteries secured to the bottom portion of housing 1101 between the driver assembly 1105 and the housing 1101 as shown. The housing 1101 can also support a ballast mass 1111 fixed to the housing 1101 below the driver assembly 1105. The driver sub-assembly 1105, the one or more electrical power sources 1109 and ballast mass 1111 (when present) effectively provide a unitary pendulum mass with a center of gravity that is naturally below the rotational central axis 1107 of the pendulum assembly 1003. This unitary pendulum mass is rotatable about the central axis 1107 in either a first rotational direction (clockwise) or a second rotational direction (counter-clockwise) to impart motion to the vehicle. The end plate 1103B is rigidly secured to the housing 1101 by fasteners (e.g., bolts) 1113 disposed about the periphery of the end plate 1103B as shown. The opposite end plate 1103A can be formed as an integral part of the housing 1101, or possibly rigidly secured to the housing 1101 similar to end plate 1103B. The end plates 1103A, 1103B include corresponding central openings 1115A, 1115B (one opening 1115B for end plate 1103B as shown) which accommodate passage of corresponding drive shafts that are mechanically coupled to the left and right rotating members 1007A, 1007B as described herein. The driver sub-assembly 1105 is rigidly secured to the end plates 1103A, 1103B and thus to the housing 1101 by fasteners (e.g., bolts) 1117 disposed outside the periphery of the central openings 1115A, 1115B as shown. The housing 1101, end plate 1103B, end plate 1103A and drive shafts that extends through the openings in the end plates 1103A, 1103B can employ one more seals or sealing material (e.g., epoxy) to prevent moisture and water from entering the interior space of the housing 1101 during use.

As shown in FIG. 8, the left and right rotating members 1007A, 1007B are disposed adjacent the opposite ends (end plates 1103A, 1103B) of the housing 1101 of the pendulum assembly 1003. Each one of the left and right rotating members 1007A, 1007B is configured to rotate about a respective drive axis in either a first rotational direction (clockwise) or second rotational direction (counter-clockwise) when viewed from an observation point outside the vehicle looking at the respective left and right rotating members 1007A, 1007B. The respective drive axes of the left and right rotating members 1007A, 1007B are coaxial with one another and co-axial with the rotational central axis 1005 of the pendulum assembly.

Figure 10:
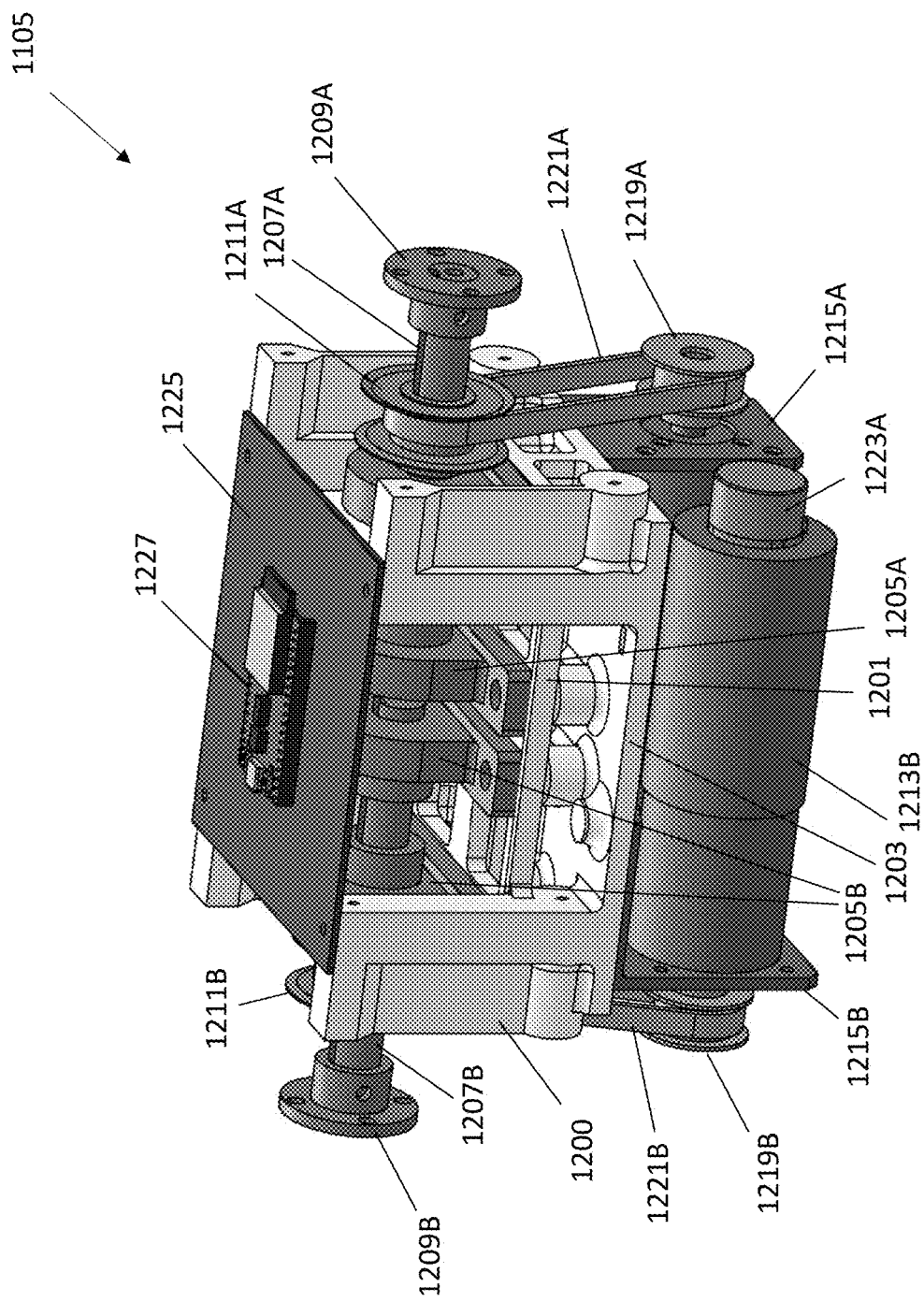
FIG. 10 is a perspective view of the driver sub-assembly of the pendulum assembly of FIG. 9.
Figure 11:
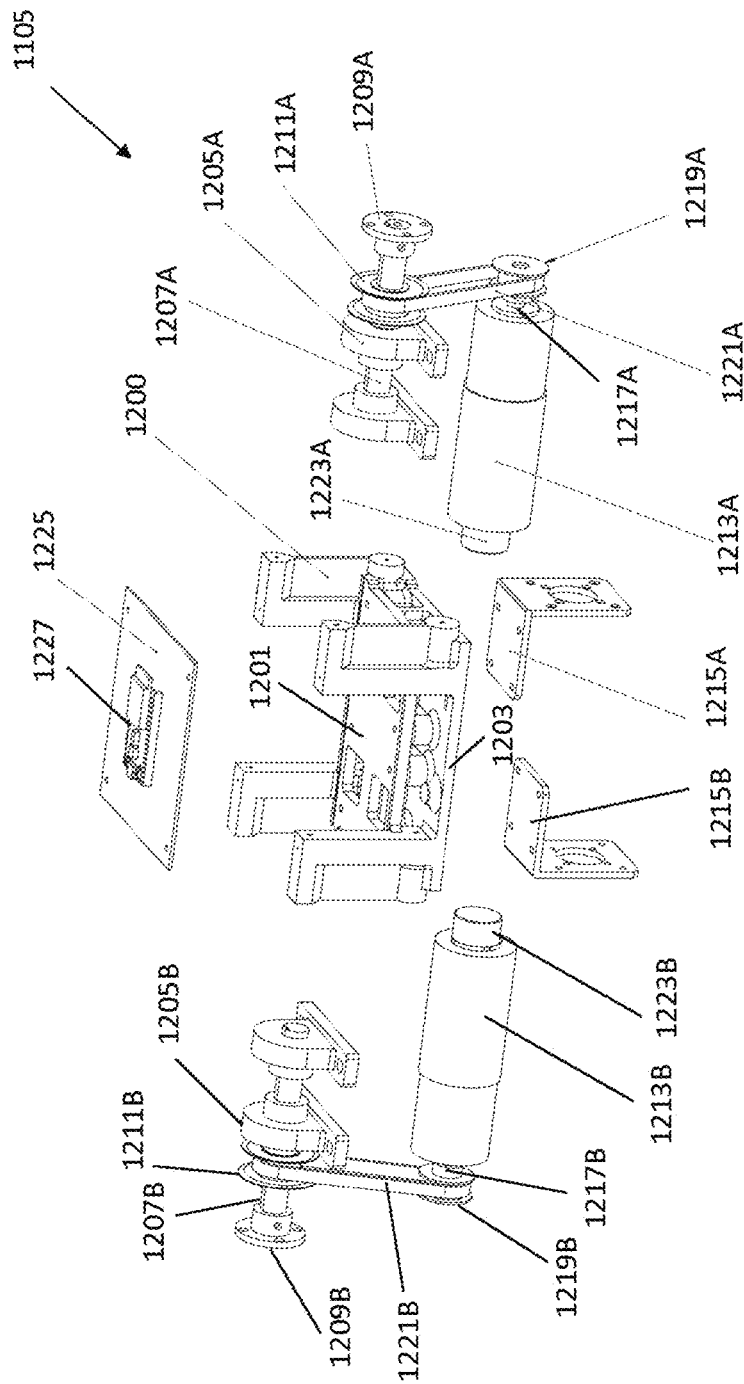
FIG. 11 is an exploded view of the driver sub-assembly of the pendulum assembly of FIG. 9.

As shown in FIGS. 10 and 11, the driver sub-assembly 1105 includes a platform 1200 having opposed support trays 1201, 1203. The top support tray 1201 supports left and right bearing mounts 1205A, 1205B for corresponding coaxial left and right drive shafts 1207A, 1207B. The left and right bearing mounts 1205A, 1205B are mounted to the top surface of the support tray 1201 and extend upward from the support tray 1201. The central axes of the left and right drive shafts 1207A, 1207B corresponds to the coaxial drive axes of the left and right rotating members 1007A, 1007B and is coaxial with the rotational central axis 1005 of the pendulum assembly 1003. A left coupler 1209A mechanically couples the left drive shaft 1207A to the left rotating member 1007A such that the left rotating member 1007A rotates with the left drive shaft 1207A. A right coupler 1209B mechanically couples the right drive shaft 1207B to the right rotating member 1007B such that the right rotating member 1007B rotates with the right drive shaft 1207B. A pulley or gear 1211A is mechanically coupled to the left drive shaft 1207A and rotates with the left drive shaft 1207A. A pulley or gear 1211B is mechanically coupled to the right drive shaft 1207B and rotates with the right drive shaft 1207B.

The bottom support tray 1203 supports left and right electrical motors 1213A, 1213B mounted under the support tray 1203 by corresponding mounting brackets 1215A, 1215B that extend downward from the bottom surface of the support tray 1203. The left electrical motor 1213A has an output shaft 1217A. A pulley or gear 1219A is mechanically coupled to the output shaft 1217A and rotates with the output shaft 1217A. The right electrical motor 1213B has an output shaft 1217B. A pulley or gear 1219B is mechanically coupled to the output shaft 1217B and rotates with the output shaft 1217B. A left belt or chain 1221A mechanically couples the gear or pulley 1219A to the gear or pulley 1211A, and a second belt or chain 1221B mechanically couples the gear or pulley 1219B to the gear or pulley 1211A such that the rotation of the output shaft 1217A driven by the left electrical motor 1213A and/or the rotation of the output shaft 1217B driven by right electrical motor 1213B imparts pendulum rotation of the driver sub-assembly 1105 and the attached pendulum assembly 1003 about the rotational central axis 1005 to propel the vehicle 1001. The left and right electrical motors 1213A, 1213B and associated components of the driver sub-assembly 1105 contribute to the effective pendulum mass of the pendulum assembly 1003.

The left electrical motor 1213A can be controlled to drive rotation of the output shaft 1217A in a first rotational direction (clockwise) or a second rotational direction (counter-clockwise). Similarly, the right electrical motor 1213B can be controlled to drive rotation of the output shaft 1217B in a first rotational direction (clockwise) or a second rotational direction (counter-clockwise). The rotation of the output shaft 1217A in its second rotational direction (counter-clockwise) and/or the rotation of the output shaft 1217B in its first rotational direction (clockwise) imparts clockwise pendulum rotation of the pendulum assembly 1003 about the rotational axis 1005 to propel the vehicle in a traveling direction with a forward directional component). The rotation of the output shaft 1217A in its first rotational direction (clockwise) and/or the rotation of the output shaft 1217B in its second rotational direction (counter-clockwise) imparts counter-clockwise pendulum rotation of the pendulum assembly 1003 about the rotational axis 1005 to propel the vehicle in a traveling direction with a rearward directional component.

The left electrical motor 1213A includes a rotary encoder 1223A that converts angular position or motion of the output shaft 1217A to an analog or digital output signal. The right electrical motor 1213B includes a rotary encoder 1223B that converts angular position or motion of the output shaft 1217B to an analog or digital output signal. The output signals of the encoders 1223A, 1223B can be used to track angular positions or shaft speeds of the respective output shafts 1217A, 1217B over time.

The platform 1200 also includes upstanding support arms that extend upward from the top support tray 1201 and support a printed circuit board 1225. Control electronics 1227 are mounted on the printed circuit board. The control electronics 1227 can include electronics for controlling operation of the left and right electrical motors for controlled movement of the vehicle 1001 (FIG. 16) The control electronics 1227 can also include wireless communication equipment (such as wireless RF modem) to allow for bidirectional data communication with a remote system (not shown). The wireless communication equipment can support bidirectional wireless data communication over one or more standard RF communication protocols, such as one or more IEEE 802.11 protocols or other suitable standard RF communication protocols. Such bidirectional communication can be used to communicate the information gathered by the sensor(s) of the unit 1009 from the unit 1009 to the remote system for storage and analysis. The bidirectional communication can also be used to communicate control signals or commands from the remote system to the unit 1009 to control operation of the vehicle 1001, such as for controlling the path of movement or target area of travel for the vehicle 1001.

Figure 12:
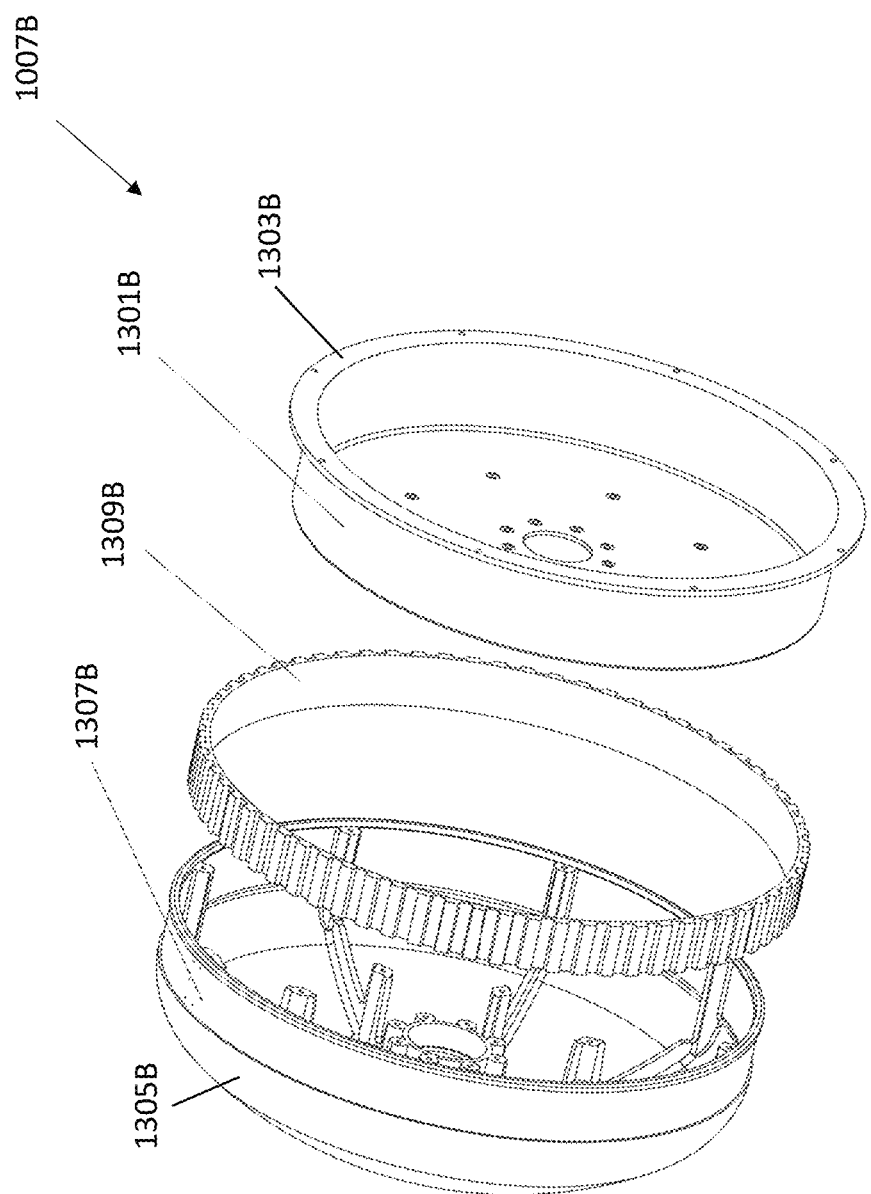
FIG. 12 is an exploded view of the right rotating member of the vehicle of FIG. 4.

As shown in FIG. 12, the right rotating member 1007B includes an inner shell 1301B with a peripheral flange 1303B that is mechanically fastened to an outer shell 1305B. The space between the inner shell 1301B and outer shell 1305B can be sealed from the environment and filled with air (or possibly air-filled closed-cell foam), which can contribute to buoyancy/floating of the vehicle when traveling through water as described herein. The closed-cell foam can contribute to the structural rigidity of the rotating member 1007B. The outer shell 1305B includes a peripheral reduced-diameter shelf 1307B. A circular track member 1309B is fixably seated in the shelf 1307B by an interference fit. The track member 1309B includes a number of ridges that engage the surface to provide for traction during movement of the vehicle 1001. The ridges can also act as small paddles that propel the vehicle in water. The central portions of the inner and outer shells 1303B, 1305B has central openings. Mechanical fasteners (e.g., bolts) are disposed about the central openings and mechanically couple the inner and outer shells 1303B, 1305B together and also mechanically couple the right rotating member 1007B to the right coupler 1209B (FIGS. 10 and 11) of the driver sub-assembly 1105. The left rotating member 1007A (not shown) includes like components, including an inner shell with a peripheral flange that is mechanically fastened to an outer shell. The space between the inner shell and outer shell can be sealed from the environment and filled with air (or possibly air-filled closed-cell foam), which can contribute to buoyancy/floating of the vehicle when traveling through water as described herein. The outer shell includes a peripheral reduced-diameter shelf. A circular track member is fixably seated in this shelf by an interference fit. The track member includes a number of ridges that engage the surface to provide for traction during movement of the vehicle. The ridges can also act as small paddles that propel the vehicle in water. The central portions of the inner and outer shells of the left rotating member 1007A including central openings. Mechanical fasteners (e.g., bolts) are disposed about the central openings and mechanically couple the inner and outer shells of the left rotating member together and also mechanically couple the left rotating member 1007A to the left coupler 1209A (FIGS. 10 and 11) of the driver sub-assembly 1105.

Figure 13:
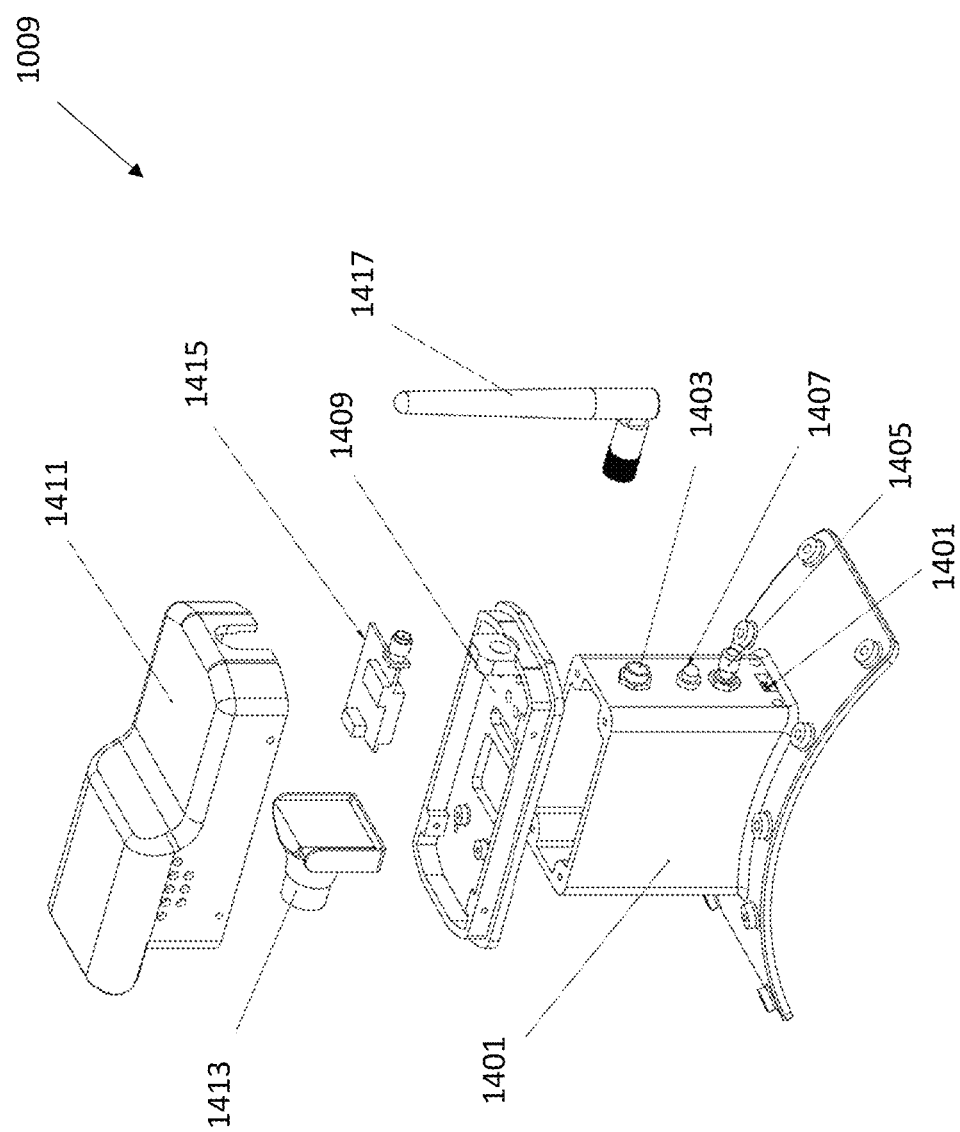
FIG. 13 is an exploded view of the sensor and communication unit of the vehicle of FIG. 4.

As shown in FIG. 13, the sensor and communication unit 1009 includes a hollow stand 1401 with a curved base that mates to the curved top outer surface of the housing 1101 about an opening in the housing 1101. The interior of the hollow stand 1401 provides a feed-through for passage of electrical conductors and wires between the unit 109 and the control electronics 1227 of the driver sub-assembly 1105. The stand 1401 can provide for input/output interfaces, such as a USB port 1401 that is electrically connected to the control electronics 1227, a power input 1403 for supplying electrical power supply for supply to the sensors and control electronics of the vehicle, an on/off switch 1405 that is electrically connected to the control electronics 1227 for turning the vehicle on and off, and an LED 1407 that is electrically connected to the control electronics 1227 for indicating operational status of the vehicle.

The top end of the hollow stand 1401 supports a sensor base 1409 and sensor cover 1411 that enclose one or more sensor(s). In embodiments, the sensor base 1409 and sensor cover 1411 enclose a camera 1413 whose field of view is directed in the forward direction. The sensor base 1409 and sensor cover 1411 can also enclose and support wireless communication equipment (e.g., wireless RF transmitter 1415 with RF antenna 1417) to allow for wireless transmission of sensor information to a remote system (not shown). Such wireless transmission can be used to communicate the sensor information gathered by the sensors of the unit 1009 (e.g., video captured by the camera 1413) from the unit 1009 to the remote system for storage and analysis.

Figure 6:
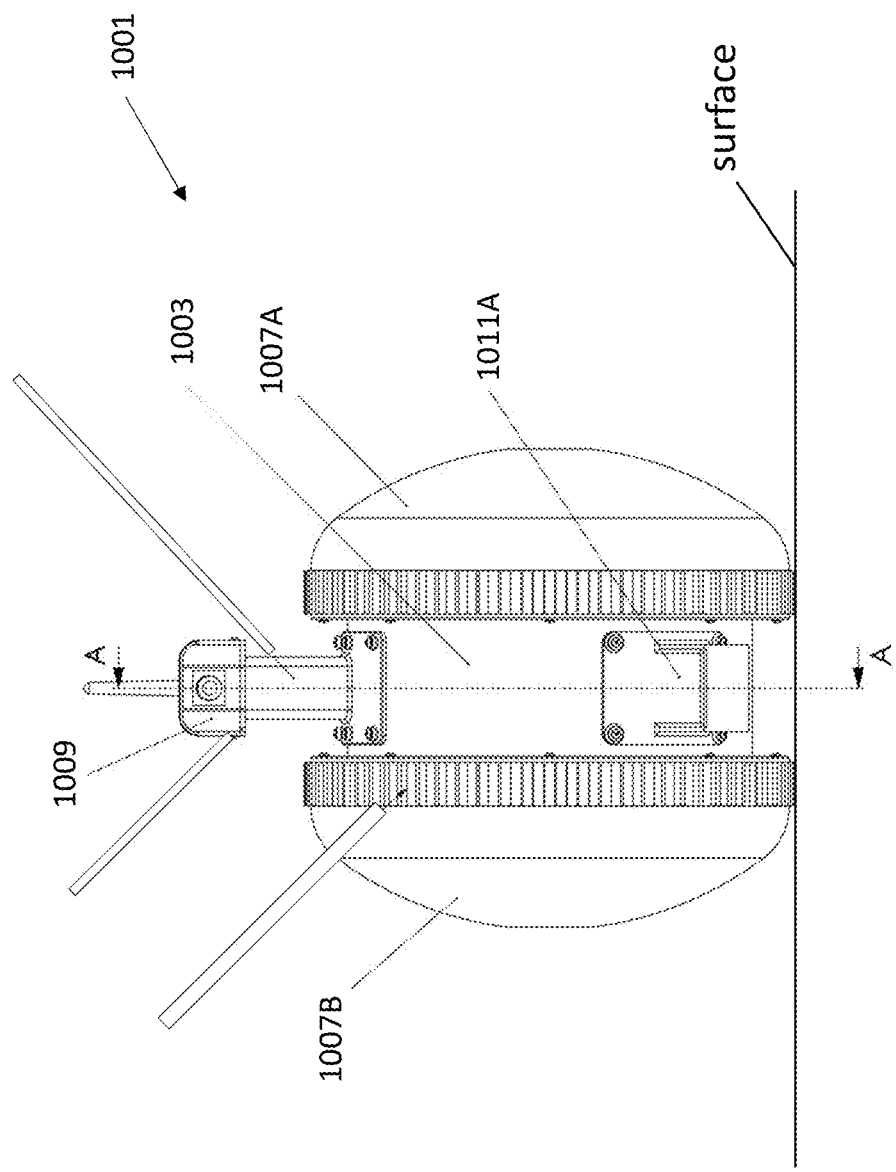
FIG. 6 is a front view of the pendulum-driven unmanned vehicle of FIG. 4 when traveling on a hard surface, such as the ground.
Figure 14:
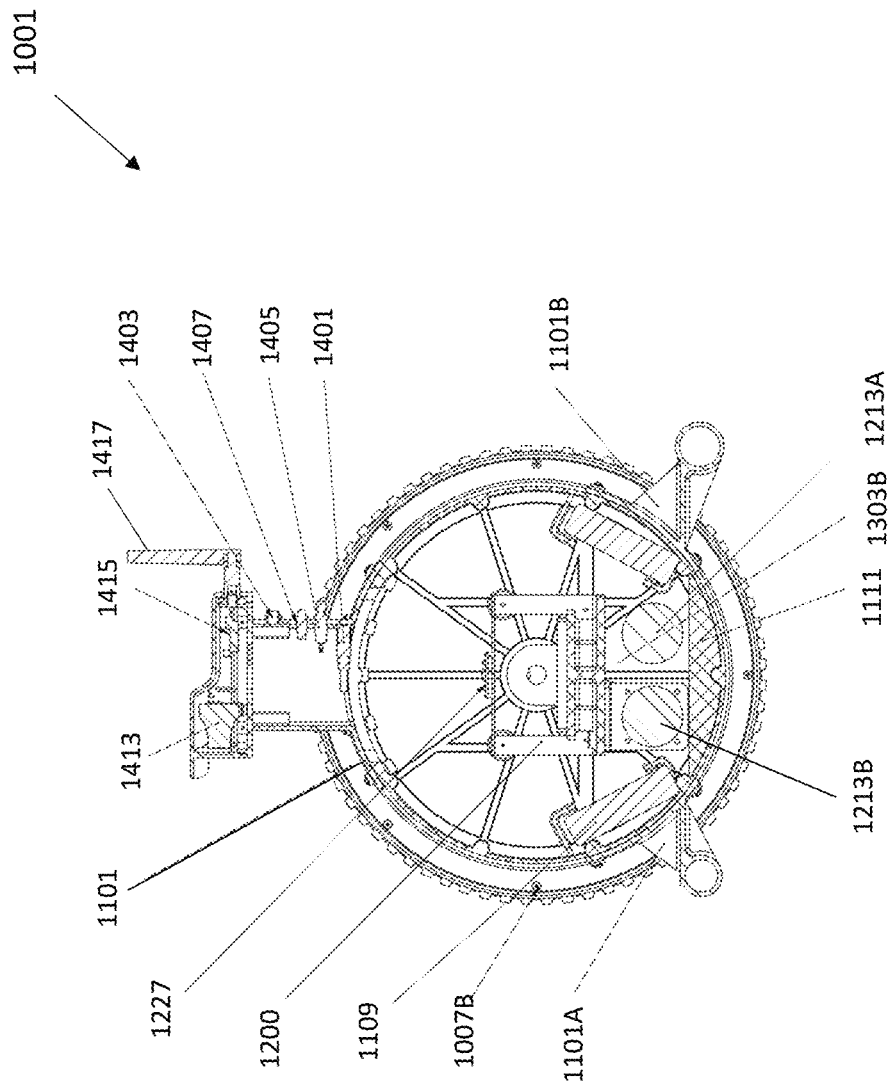
FIG. 14 is a cross-sectional view of the vehicle of FIG. 4 through section A-A of FIG. 6.

FIG. 14 shows a cross-sectional view of the vehicle 1001 through the section A-A of FIG. 6.

Figure 15:
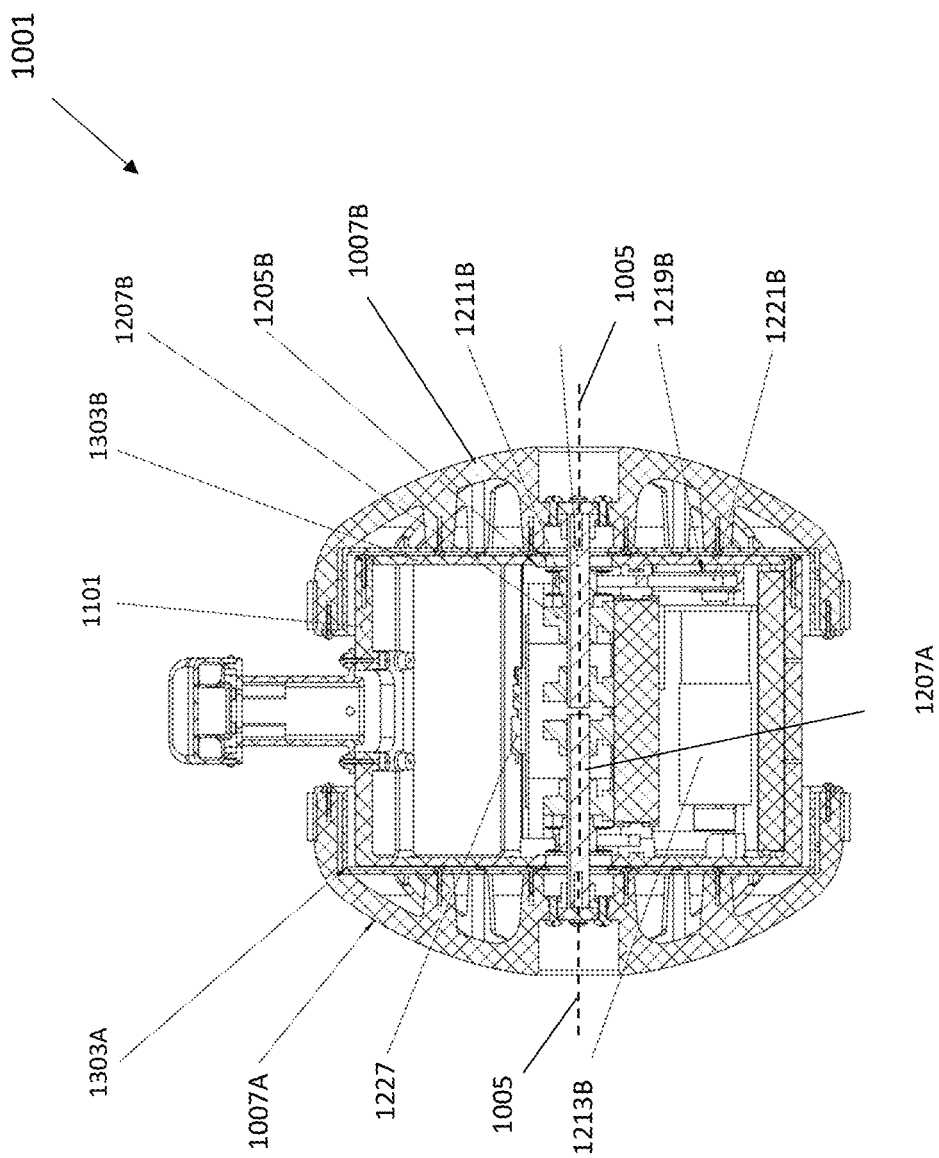
FIG. 15 is a cross-sectional view of the vehicle of FIG. 4 through section C-C of FIG. 7.

FIG. 15 shows a cross-sectional view of the vehicle 1001 through the section C-C of FIG. 7.

Figure 16:
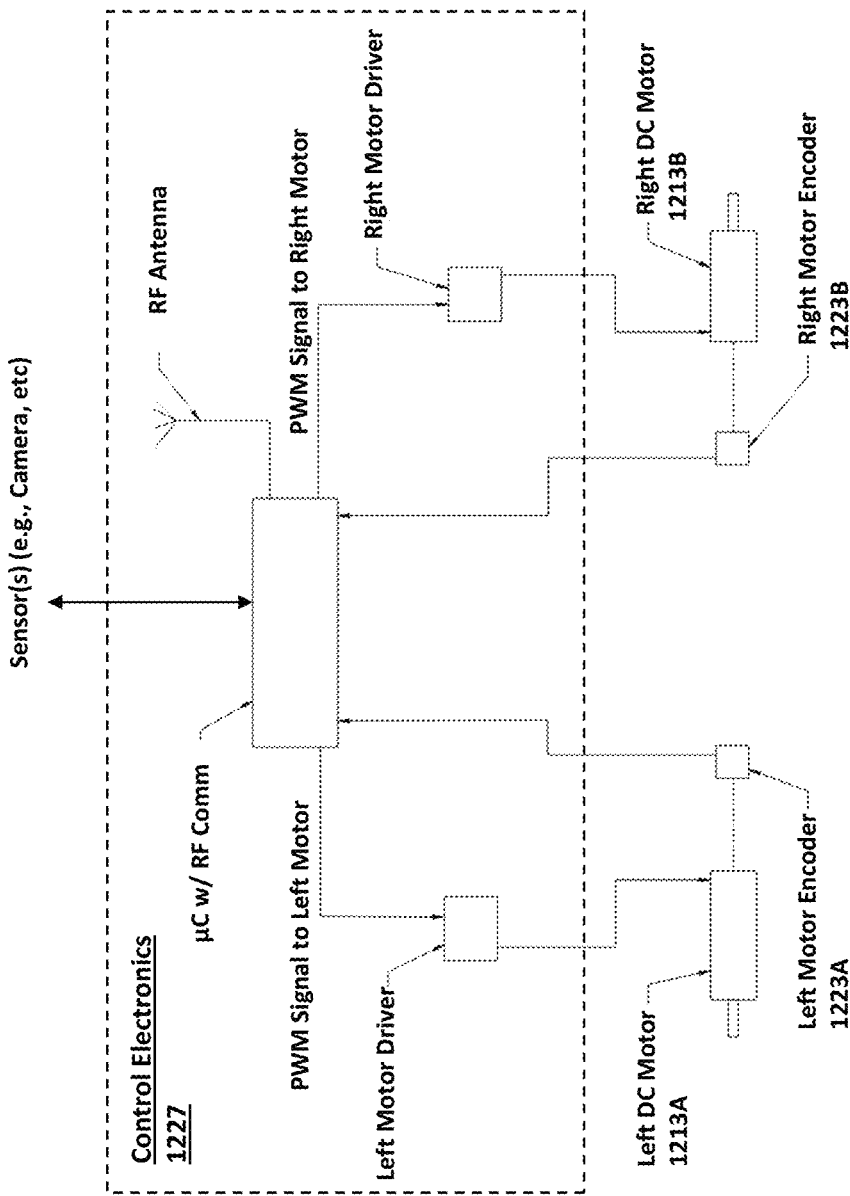
FIG. 16 is a schematic view of the control electronics of the vehicle of FIG. 4, which is housed in the pendulum assembly of FIG. 9.

FIG. 16 is a functional block diagram of exemplary control electronics, which includes a microcontroller that supplies left and right pulse-width modulation signals to corresponding left and right motor drive circuitry for driving left and right electrical motors 1213A, 1213B. The outputs of the left and right encoders 1223A, 1223B are supplied as inputs to the microcontroller for feedback and control of the rotational speed of the left and right electrical motors 1213A, 1213B.

In embodiments, the left and right electrical motors 1213A, 1213B can be controlled to propel the vehicle in desired traveling directions as shown in FIGS. 17A-24B.

Figures 17A, 17B:
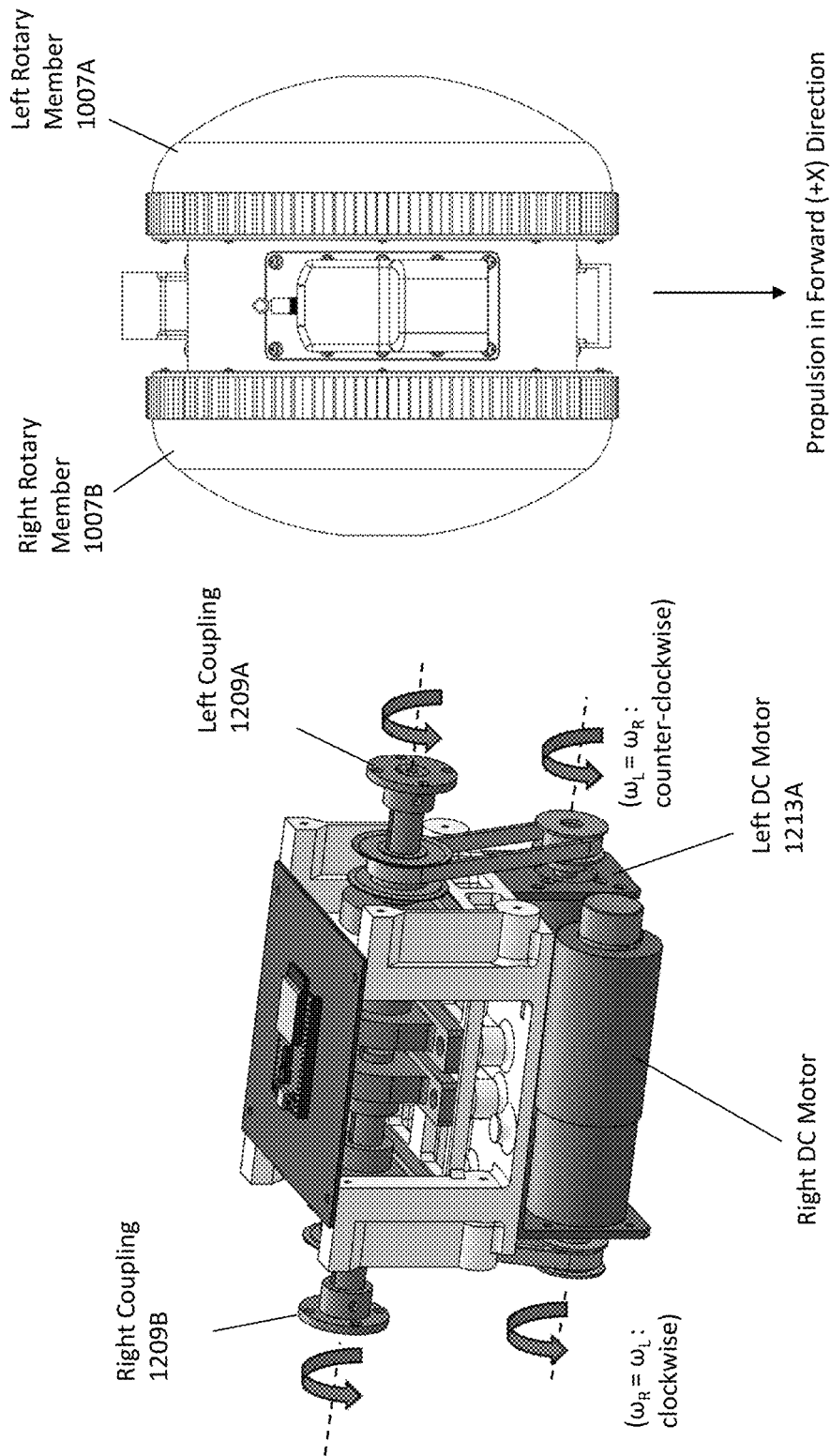
FIGS. 17A and 17B are schematic views that illustrate control of the left and right electrical motors of the driver sub-assembly of FIGS. 10 and 11 to propel the vehicle in a traveling direction corresponding to the forward directional component.

For example, the output signals of the left and right encoders 1223A, 1223B can be used to drive rotation of the output shaft 1221A of the left electrical motor 1213A in the counter-clockwise direction and rotation of the output shaft 1221B of the right electrical motor 1213B in the clockwise rotational direction at matching shaft speeds (e.g., rpms) as shown in FIG. 17A, which imparts clockwise pendulum rotation of the pendulum assembly 1003 about the rotational axis 1005 to propel the vehicle in a traveling direction corresponding to the forward directional component as shown in FIG. 17B.

In another example, the output signals of the left and right encoders 1223A, 1223B can be used to drive rotation of the output shaft 1221A of the left electrical motor 1213A in the clockwise direction and rotation of the output shaft 1221B of the right electrical motor 1213B in the counter-clockwise rotational direction at matching shaft speeds (e.g., rpms) as shown in FIG. 18A, which imparts counter-clockwise pendulum rotation of the pendulum assembly 1003 about the rotational axis 1005 to propel the vehicle in a traveling direction corresponding to the rearward directional component as shown in FIG. 18B.

In another example, the output signals of the left and right encoders 1223A, 1223B can be used to drive rotation of the output shaft 1221A of the left electrical motor 1213A in the counter-clockwise direction and rotation of the output shaft 1221B of the right electrical motor 1213B in the clockwise rotational direction where the shaft speed (e.g., rpm) of the left electrical motor 1213A is less than the shaft speed (e.g., rpm) of the right electrical motor 1213B as shown in FIG. 19A, which imparts clockwise pendulum rotation of the pendulum assembly 1003 about the rotational axis 1005 to propel the vehicle in a traveling direction with a forward component and left component as shown in FIG. 19B. The relative difference between the two shaft speeds can be used to control the steering angle. That is large differences between the two shaft speeds (where the shaft speed of the left electrical motor 1213A is less than the shaft speed of the right electrical motor 1213B) produce larger steering angles in the left direction as compared to smaller differences.

Figures 20A, 20B:
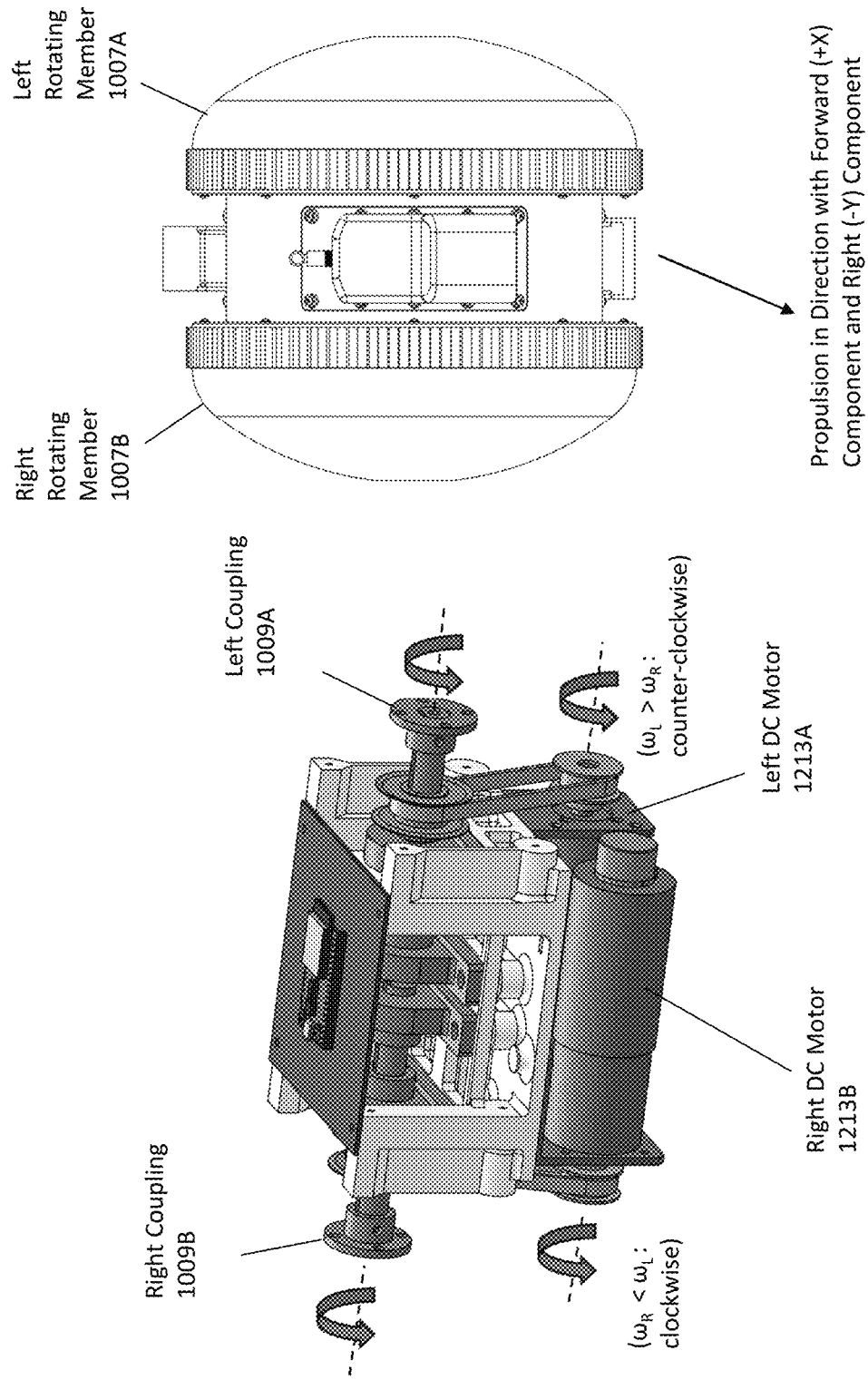
FIGS. 20A and 20B are schematic views that illustrate control of the left and right electrical motors of the driver sub-assembly of FIGS. 10 and 11 to propel the vehicle in a traveling direction with a forward directional component and a right direction component.

In yet another example, the output signals of the left and right encoders 1223A, 1223B can be used to drive rotation of the output shaft 1221A of the left electrical motor 1213A in the counter-clockwise direction and rotation of the output shaft 1221B of the right electrical motor 1213B in the clockwise rotational direction where the shaft speed (e.g., rpm) of the left electrical motor 1213A is greater than the shaft speed (e.g., rpm) of the right electrical motor 1213B as shown in FIG. 20A, which imparts clockwise pendulum rotation of the pendulum assembly 1003 about the rotational axis 1005 to propel the vehicle in a traveling direction with a forward component and right component as shown in FIG. 20B. The relative difference between the two shaft speeds can be used to control the steering angle. That is large differences between the two shaft speeds (where the shaft speed of the left electrical motor 1213A is greater than the shaft speed of the right electrical motor 1213B) produce larger steering angles in the right direction as compared to smaller differences.

Figure 21B:
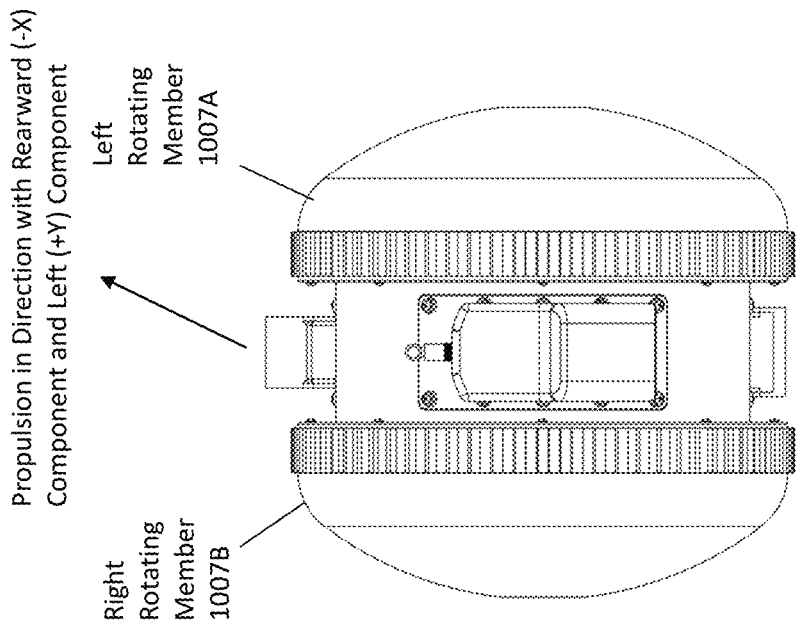
FIGS. 21A and 21B are schematic views that illustrate control of the left and right electrical motors of the driver sub-assembly of FIGS. 10 and 11 to propel the vehicle in a traveling direction with a rearward directional component and a left direction component.
Figure 21A:
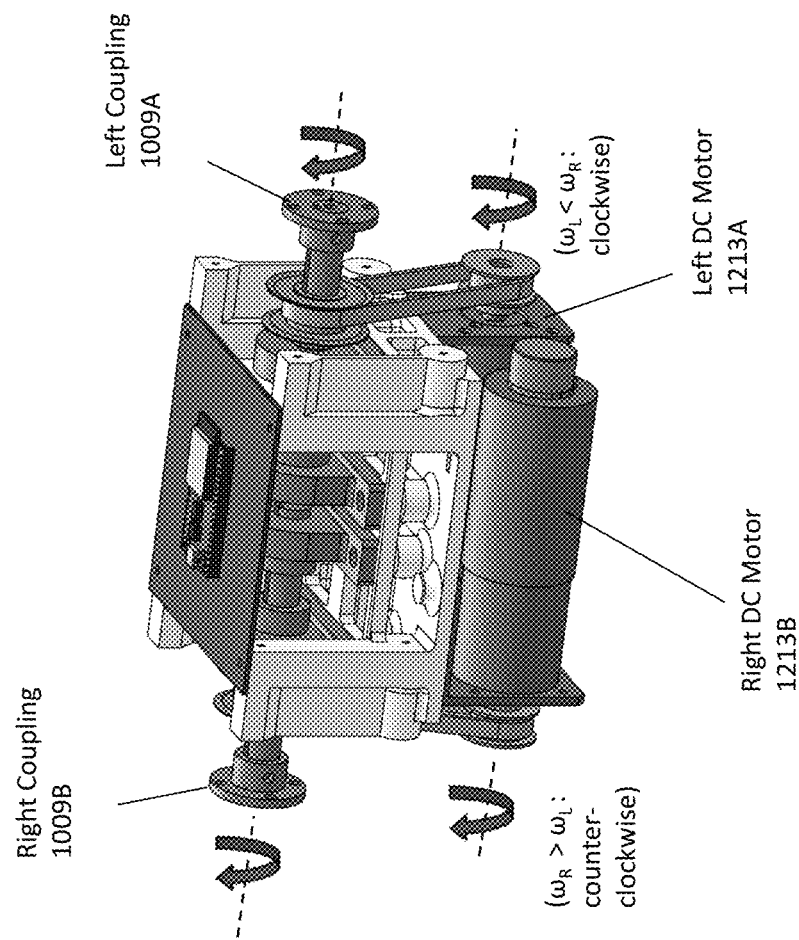

In another example, the output signals of the left and right encoders 1223A, 1223B can be used to drive rotation of the output shaft 1221A of the left electrical motor 1213A in the clockwise direction and rotation of the output shaft 1221B of the right electrical motor 1213B in the counter-clockwise rotational direction where the shaft speed (e.g., rpm) of the left electrical motor 1213A is less than the shaft speed (e.g., rpm) of the right electrical motor 1213B as shown in FIG. 21A, which imparts counter-clockwise pendulum rotation of the pendulum assembly 1003 about the rotational axis 1005 to propel the vehicle in a traveling direction with a rearward component and left component as shown in FIG. 21B. The relative difference between the two shaft speeds can be used to control the steering angle. That is large differences between the two shaft speeds (where the shaft speed of the left electrical motor 1213A is less than the shaft speed of the right electrical motor 1213B) produce larger steering angles in the left direction as compared to smaller differences.

Figure 22B:
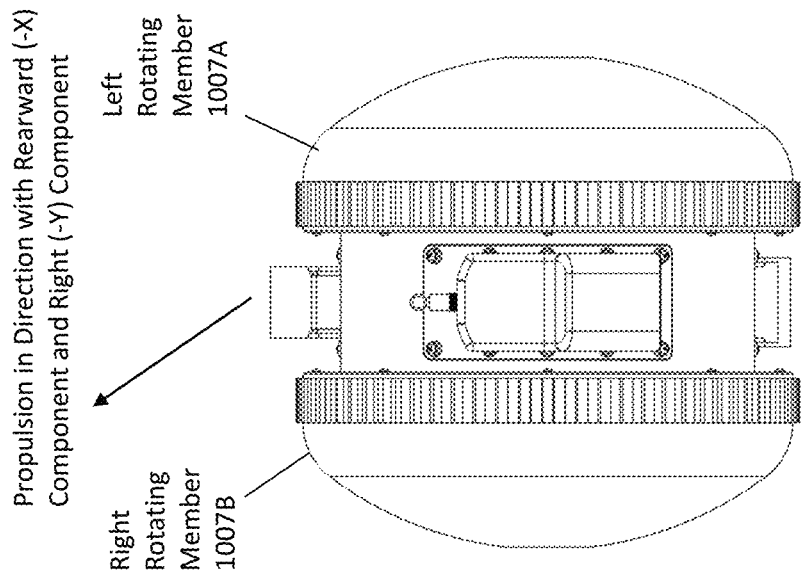
FIGS. 22A and 22B are schematic views that illustrate control of the left and right electrical motors of the driver sub-assembly of FIGS. 10 and 11 to propel the vehicle in a traveling direction with a rearward directional component and a right direction component.
Figure 22A:
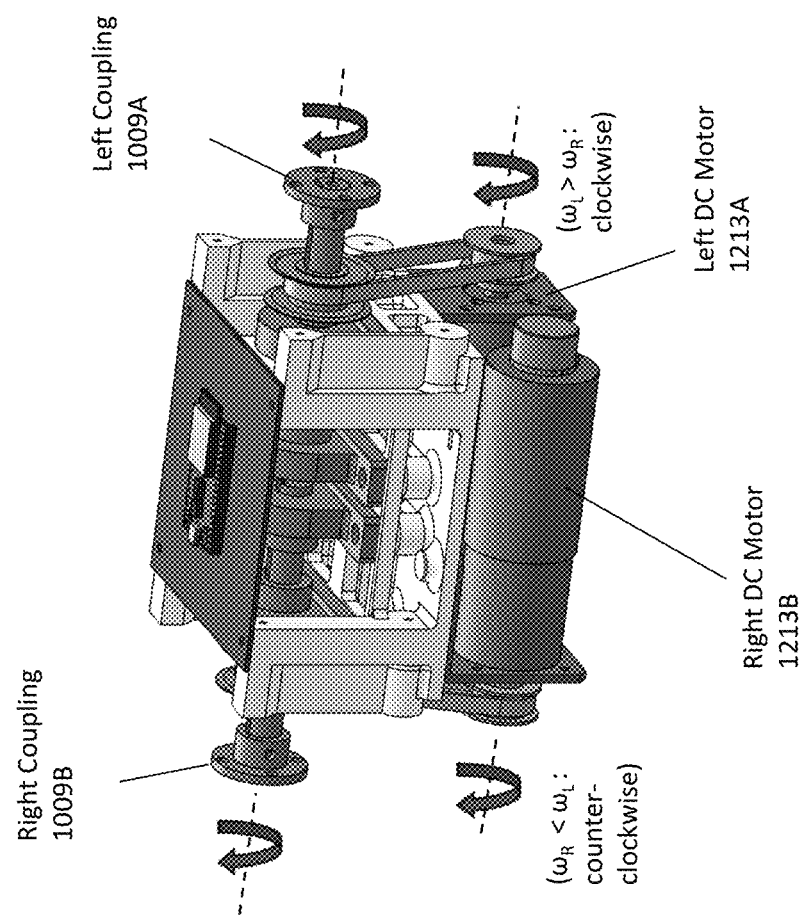

In yet another example, the output signals of the left and right encoders 1223A, 1223B can be used to drive rotation of the output shaft 1221A of the left electrical motor 1213A in the clockwise direction and rotation of the output shaft 1221B of the right electrical motor 1213B in the counter-clockwise rotational direction where the shaft speed (e.g., rpm) of the left electrical motor 1213A is greater than the shaft speed (e.g., rpm) of the right electrical motor 1213B as shown in FIG. 22A, which imparts counter-clockwise pendulum rotation of the pendulum assembly 1003 about the rotational axis 1005 to propel the vehicle in a traveling direction with a rearward component and right component as shown in FIG. 22B. The relative difference between the two shaft speeds can be used to control the steering angle. That is large differences between the two shaft speeds (where the shaft speed of the left electrical motor 1213A is greater than the shaft speed of the right electrical motor 1213B) produce larger steering angles in the right direction as compared to smaller differences.

In yet another example, the output signals of the left and right encoders 1223A, 1223B can be used to drive rotation of the output shaft 1221A of the left electrical motor 1213A in the clockwise direction and rotation of the output shaft 1221B of the right electrical motor 1213B in the counter-clockwise rotational direction where the shaft speed (e.g., rpm) of the left electrical motor 1213A is greater than the shaft speed (e.g., rpm) of the right electrical motor 1213B as shown in FIG. 22A, which imparts counter-clockwise pendulum rotation of the pendulum assembly 1003 about the rotational axis 1005 to propel the vehicle in a traveling direction with a rearward component and right component as shown in FIG. 22B. The relative difference between the two shaft speeds can be used to control the steering angle. That is large differences between the two shaft speeds (where the shaft speed of the left electrical motor 1213A is greater than the shaft speed of the right electrical motor 1213B) produce larger steering angles in the right direction as compared to smaller differences.

Figures 23A, 23B:
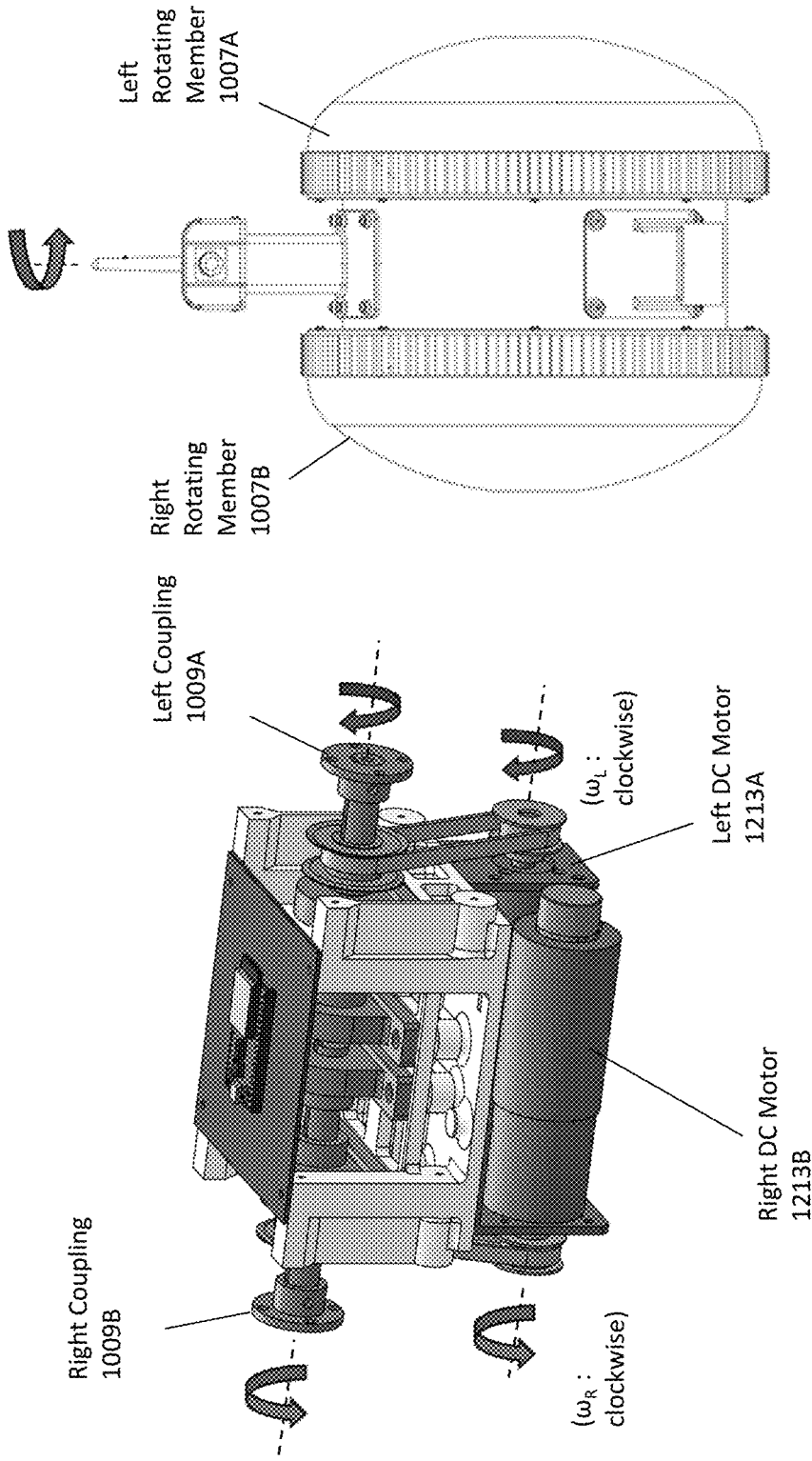
FIGS. 23A and 23B are schematic views that illustrate control of the left and right electrical motors of the driver sub-assembly of FIGS. 10 and 11 to propel the vehicle in a counter-clockwise spinning movement about the vertical axis through the center of the vehicle.

In yet another example, the output signals of the left and right encoders 1223A, 1223B can be used to drive rotation of the output shaft 1221A of the left electrical motor 1213A in the clockwise direction and rotation of the output shaft 1221B of the right electrical motor 1213B in the clockwise rotational direction as shown in FIG. 23A, which imparts counter-clockwise spinning movement of the vehicle about the vertical (Z) axis as shown in FIG. 23B.

Figures 24A, 24B:
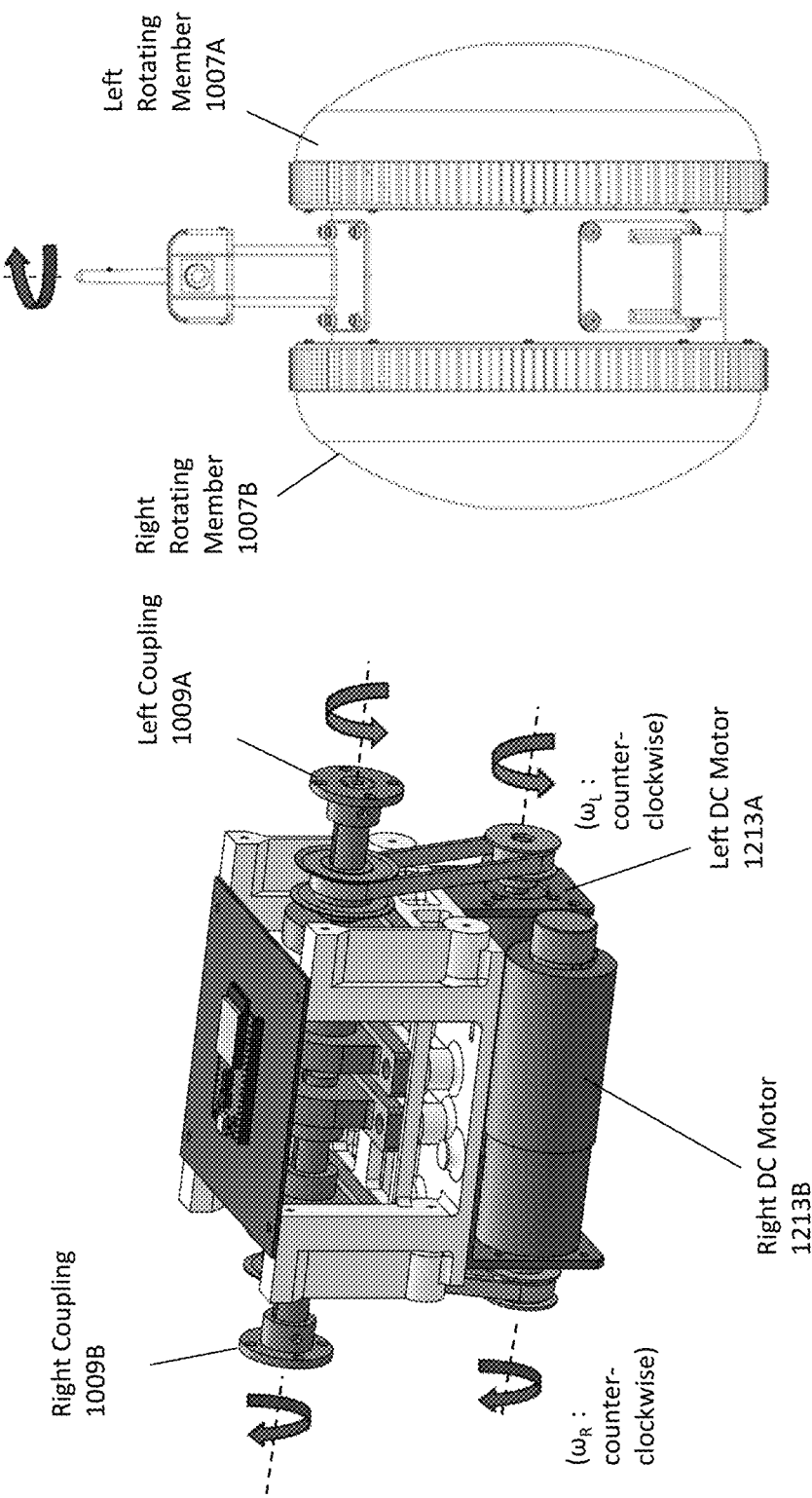
FIGS. 24A and 24B are schematic views that illustrate control of the left and right electrical motors of the driver sub-assembly of FIGS. 10 and 11 to propel the vehicle in a clockwise spinning movement about the vertical axis through the center of the vehicle.

In still another example, the output signals of the left and right encoders 1223A, 1223B can be used to drive rotation of the output shaft 1221A of the left electrical motor 1213A in the counter-clockwise direction and rotation of the output shaft 1221B of the right electrical motor 1213B in the counter-clockwise rotational direction as shown in FIG. 24A, which imparts clockwise spinning movement of the vehicle about the vertical (Z) axis as shown in FIG. 24B.

Figure 25A:
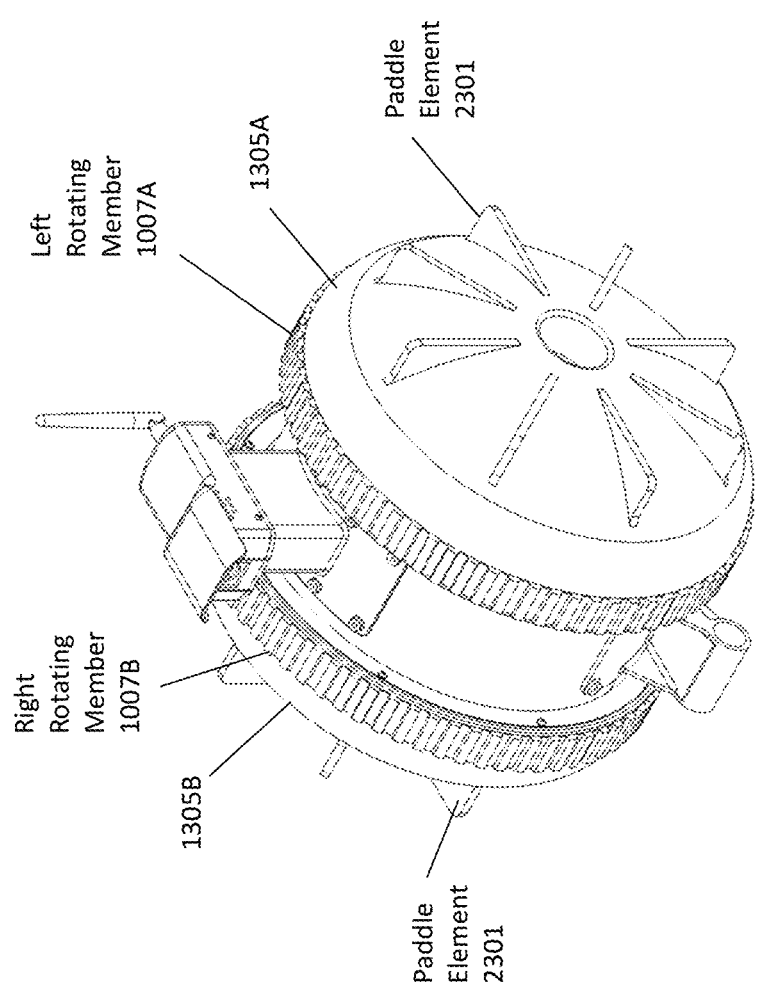
FIG. 25A is a perspective view of a pendulum-driven unmanned vehicle according to an alternate embodiment of the present disclosure which employs left and right rotating members with paddle elements.

In another embodiment shown in FIGS. 25A-25C, the outer shells 1305A, 1305B of the left and right rotating members 1007A, 1007B can include paddle or blade elements 2301 that extend radially from the respective central openings and rotational axes of the two rotating members. Such paddle or blade elements are specifically adapted to aid in propelling the vehicle through water. Note that when the vehicle is traveling on a hard surface (e.g., ground), the paddle or blade elements 2301 are not used to propel the vehicle; however, when the vehicle is traveling in water, the tracks and paddle elements of the vehicle are used to propel the vehicle through the water. In this configuration, the bottom portion of the vehicle will sit below the water level and the wider end portions of the paddle or blade elements will enter the water and aid in propelling the vehicle through water as the rotating members 1007A, 1007B rotate about the central rotational axis 1005.

In other embodiments, the support structures 1101A, 110B can be adapted to have rollers or wheels to minimize rolling resistance on the ground. Additional or alternatively, the support structures 1101A, 110B can be adapted to provide buoyancy in water in order to resist and/or limit downward movement under the water level when the vehicle is traveling in water. For example, the support structures 1101A, 110B can have an interior sealed space that is filled with air or air-filled closed-cell foam to provide additional buoyancy on the front side or back side of the pendulum assembly to keep pendulum assembly from extreme angle rotation.

Note that when the rear support structure 1011B contacts the surface (e.g., ground or water) at the predefined maximum angle of rotation of the pendulum assembly 1003 toward the forward direction, the operating mode of the left electrical motor 1213A and/or the right electrical motor 1213B that drives such rotation can be configured to automatically transition to a direct-drive mode where the output rotational torque of the respective motor(s) 1213A, 1213B drives the corresponding rotating member 1007A and/or 1007B to move the vehicle in the forward direction as described herein. Similarly, when the front support structure 1011A contacts the surface (e.g., ground or water) at the predefined maximum angle of rotation of the pendulum assembly 1003 toward the rearward direction, the operating mode of the left electrical motor 1213A and/or the right electrical motor 1213B that drives such rotation can be configured to automatically transition to a direct-drive mode where the output rotational torque of the respective motor(s) 1213A, 123B drives the corresponding rotating member 1007A and/or 1007B to move the vehicle in the rearward direction as described herein. Such direct-drive mode can possibly be used to overcome obstacles or hilly terrain that would otherwise need to be avoided by the navigation of the vehicle.

There have been described and illustrated herein several embodiments of a pendulum-driven unmanned vehicle. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed.

What is claimed is:

1. An unmanned vehicle comprising:
   a housing configured to rotate about a rotational axis, wherein the housing supports a pendulum drive assembly having coaxial first and second drive axles that are coaxially aligned with the rotational axis;
   a first rotating member that is mechanically coupled to the first drive axle and configured to rotate with the first drive axle; and
   a second rotating member that is mechanically coupled to the second drive axle and configured to rotate with the second drive axle;
   wherein the pendulum drive assembly includes a first electrical motor and corresponding first transmission system that are operably coupled to the first drive axle as well as a second electrical motor and corresponding second transmission system that are operably coupled to the second drive axle, wherein the first electrical motor, the first transmission system, the second electrical motor, and the second transmission system contribute to an effective pendulum mass disposed within the housing that rotates about the rotational axis of the housing relative to the housing and driven by operation of at least one the first electrical motor and second electrical motor to propel the unmanned vehicle;
   wherein the pendulum drive assembly further includes first and second rotary encoders that correspond to the first and second electrical motors, wherein the first rotary encoder is configured to measure output shaft rotation of the first electrical motor and produce output signals that are used to control operation of the first electrical motor, wherein the second rotary encoder is configured to measure output shaft rotation of the second electrical motor and produce output signals that are used to control operation of the second electrical motor, and wherein the output signals of the first and second rotary encoders are used to drive output shaft rotations of the first and second electrical motors in opposed rotational directions at matching shaft speeds to propel the vehicle in a traveling direction with a forward or rearward directional component.

2. An unmanned vehicle according to claim 1, wherein:
   the housing supports a sensor and communication unit.

3. An unmanned vehicle according to claim 2, wherein:
   the sensor and communication unit comprises at least one of a video camera and wireless communication equipment for communication to a remote system.

4. An unmanned vehicle according to claim 1, further comprising:
   first and second supports that extend from opposite sides of the housing, wherein the first and second supports are configured to interface to the surface traversed by the vehicle and limit rotational movement of the housing about the rotational axis.

5. An unmanned vehicle according to claim 4, wherein:
   the first and second supports comprise rollers or wheels to minimize rolling resistance on the ground.

6. An unmanned vehicle according to claim 4, wherein:
   the first and second supports are configured to provide buoyancy in water in order to resist and/or limit downward movement under the water level when the vehicle is traveling in water.

7. An unmanned vehicle according to claim 1, wherein:
   the first and second rotating members have respective outer shells that include at least one paddle or blade element that extends radially relative to the rotational axes of the respective first and second rotating members, wherein the at least one paddle or blade element is adapted to aid in propelling the vehicle through water.

8. An unmanned vehicle according to claim 7, wherein:
   the at least one paddle or blade element is configured such that it not used to propel the vehicle when the vehicle is traveling on a hard surface.

9. An unmanned vehicle according to claim 1, wherein:
   the output signals of the first and second rotary encoders are further used to drive output shaft rotations of the first and second electrical motors in opposed rotational directions at different shaft speeds to propel the vehicle in a traveling direction with a left or right directional component.

10. An unmanned vehicle according to claim 9, wherein:
    relative difference between the shaft speeds the first and second electrical motors controls a steering angle of the vehicle.

11. An unmanned vehicle according to claim 1, wherein:
    the output signals of the first and second rotary encoders are further used to drive output shaft rotations of the first and second electrical motors in matching rotational directions to impart spinning movement of the vehicle about a vertical axis.

* * * * *